(12) United States Patent
Yang et al.

(10) Patent No.: US 9,477,000 B2
(45) Date of Patent: Oct. 25, 2016

(54) SYSTEM AND METHOD FOR THE REMOVAL OF SHALLOW WATER MULTIPLES USING A HYBRID MULTI-CHANNEL PREDICTION METHOD

(71) Applicant: CGG Services SA, Massy (FR)

(72) Inventors: Kunlun Yang, Singapore (SG); Barry Hung, Singapore (SG)

(73) Assignee: CGG SERVICES SA, Massy (FR)

( * ) Notice: Subject to any disclaimer, the term of this patent is extended or adjusted under 35 U.S.C. 154(b) by 336 days.

(21) Appl. No.: 14/107,583

(22) Filed: Dec. 16, 2013

(65) Prior Publication Data

US 2014/0198613 A1  Jul. 17, 2014

Related U.S. Application Data

(60) Provisional application No. 61/751,573, filed on Jan. 11, 2013.

(51) Int. Cl.
*G01V 1/38* (2006.01)
*G01V 1/36* (2006.01)
*G01V 1/28* (2006.01)

(52) U.S. Cl.
CPC .............. *G01V 1/362* (2013.01); *G01V 1/28* (2013.01)

(58) Field of Classification Search
None
See application file for complete search history.

(56) References Cited

U.S. PATENT DOCUMENTS 6,005,916 A * 12/1999 Johnson ................... A61B 5/05
378/87

| 2006/0084859 | A1* | 4/2006 | Johnson | A61B 5/0507 600/407 |
| 2007/0247163 | A1* | 10/2007 | Rosten | G01V 3/083 324/344 |
| 2008/0019215 | A1* | 1/2008 | Robertsson | G01V 1/3808 367/19 |
| 2009/0076389 | A1* | 3/2009 | Jin | G01S 13/9035 600/437 |
| 2011/0046907 | A1* | 2/2011 | Gilmore | G06T 11/006 702/85 |
| 2013/0242696 | A1* | 9/2013 | van Groenestijn | G01V 1/364 367/24 |

OTHER PUBLICATIONS

Hargreaves, "Surface Multiple Attenuation in Shallow Water and in the Construction of Primaries from Multiples", SEG, New Orleans 2006 Annual Meeting Sep. 29-Oct. 4, 2006, pp. 2689-2693.*
A.J. Berkhout et al., "One-Way Versions of the Kirchhoff Integral", Geophysics, Apr. 1989, pp. 460-467, vol. 54, No. 4.

(Continued)

*Primary Examiner* — Krystine Breier
(74) *Attorney, Agent, or Firm* — Patent Portfolio Builders PLLC

(57) ABSTRACT

A system and method are provided for determining shallow water multiples when seismically exploring a geographical area of interest under a body of water. The system and method estimate a multi-channel prediction operator F using a model of water layer related multiples with respect to received and stored seismic data, estimate a travel time of the transmitted seismic wavelets from the one or more sources to each of the plurality of receivers, and then generate water layer primary reflections models using the estimated travel time and Green's function. The system and method then merge the generated water layer primary reflections models with the multi-channel prediction operator F to create a hybrid multi-channel prediction operator $F_H$, and convolute the hybrid multi-channel prediction operator $F_H$ with the stored received data to determine a final multiples model.

19 Claims, 15 Drawing Sheets

(56) References Cited

OTHER PUBLICATIONS

A.J. Berkhout et al., "Removal of Internal Multiples with the Common-Focus-Point (CFP) Approach: Part 1—Explanation of the Theory", Geophysics, May-Jun. 2005, pp. V45-V60, vol. 70, No. 3.
J. Biersteker, "MAGIC: Shell's Surface Multiple Attenuation Technique", SEG International Exposition and Annual Meeting, San Antonio, Texas, Sep. 9-14, 2001.
N. Hargreaves, "Surface Multiple Attenuation in Shallow Water and the Construction of Primaries from Multiples", SEG, New Orleans 2006 Annual Meeting, Sep. 29-Oct. 4, 2006, pp. 2689-2693.

B. Hung et al., "Shallow Water Demultiple", ASEG 2010, Sydney, Australia, Aug. 22-26, 2010, pp. 1-4.
H. Jin et al., "Model-Based Water-Layer Demultiple (MWD) for Shallow Water: from Streamer to OBS", SEG Las Vegas 2012 Annual Meeting, Nov. 4-9, 2012, pp. 1-5.
S. King et al., "Suppressing Nonphysical Relfections in Green's Function Estimates Using Source-Receiver Interferometry", Geophysics, Jan.-Feb. 2012, pp. Q15-Q25, vol. 77, No. 1.
A le;2q. Pica et al., "3D Surface-Related Multiple Modeling, Principles and Results", SEG Houston 2005 Annual Meeting, Nov. 6-11, 2005, pp. 2080-2083.

* cited by examiner

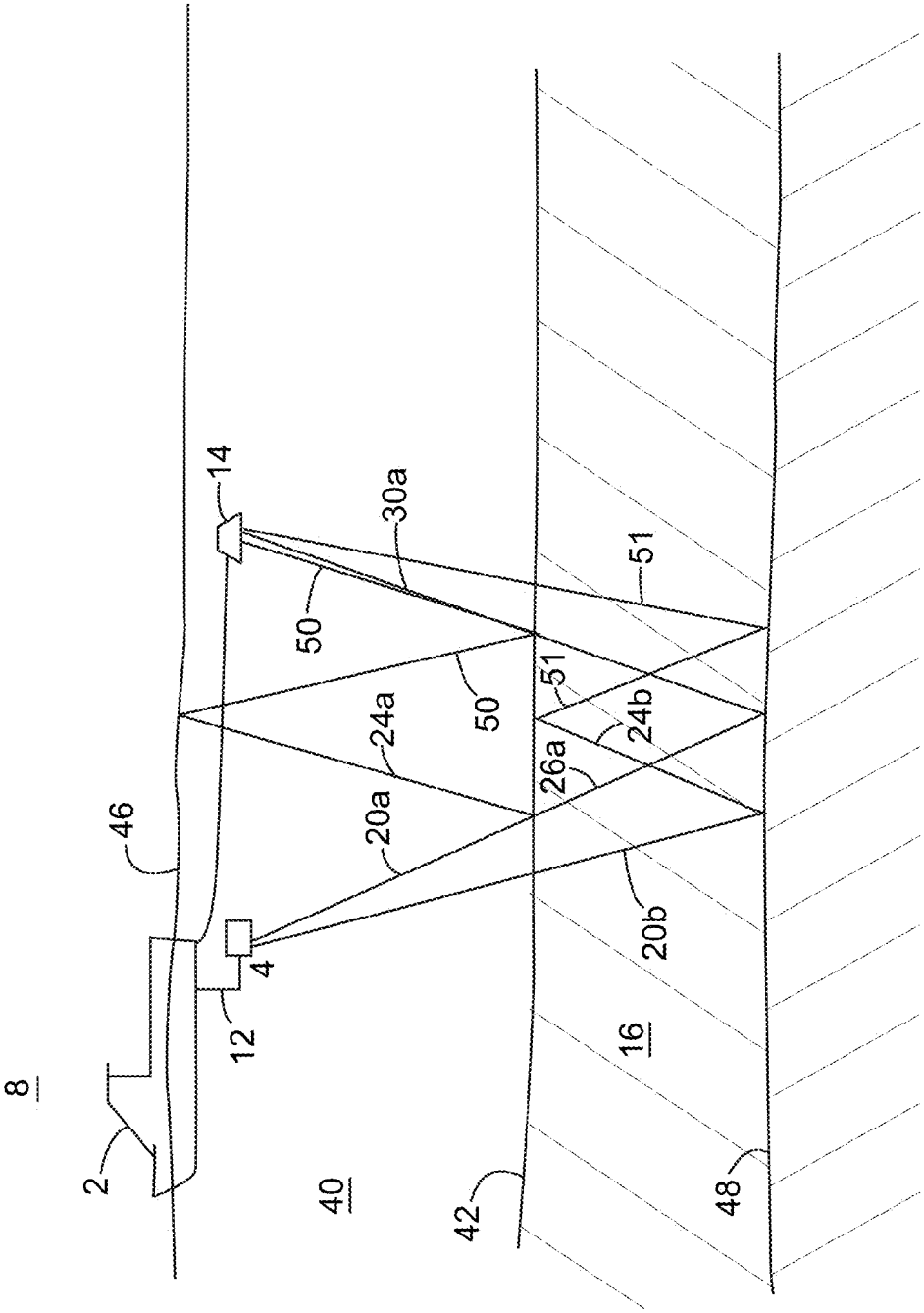

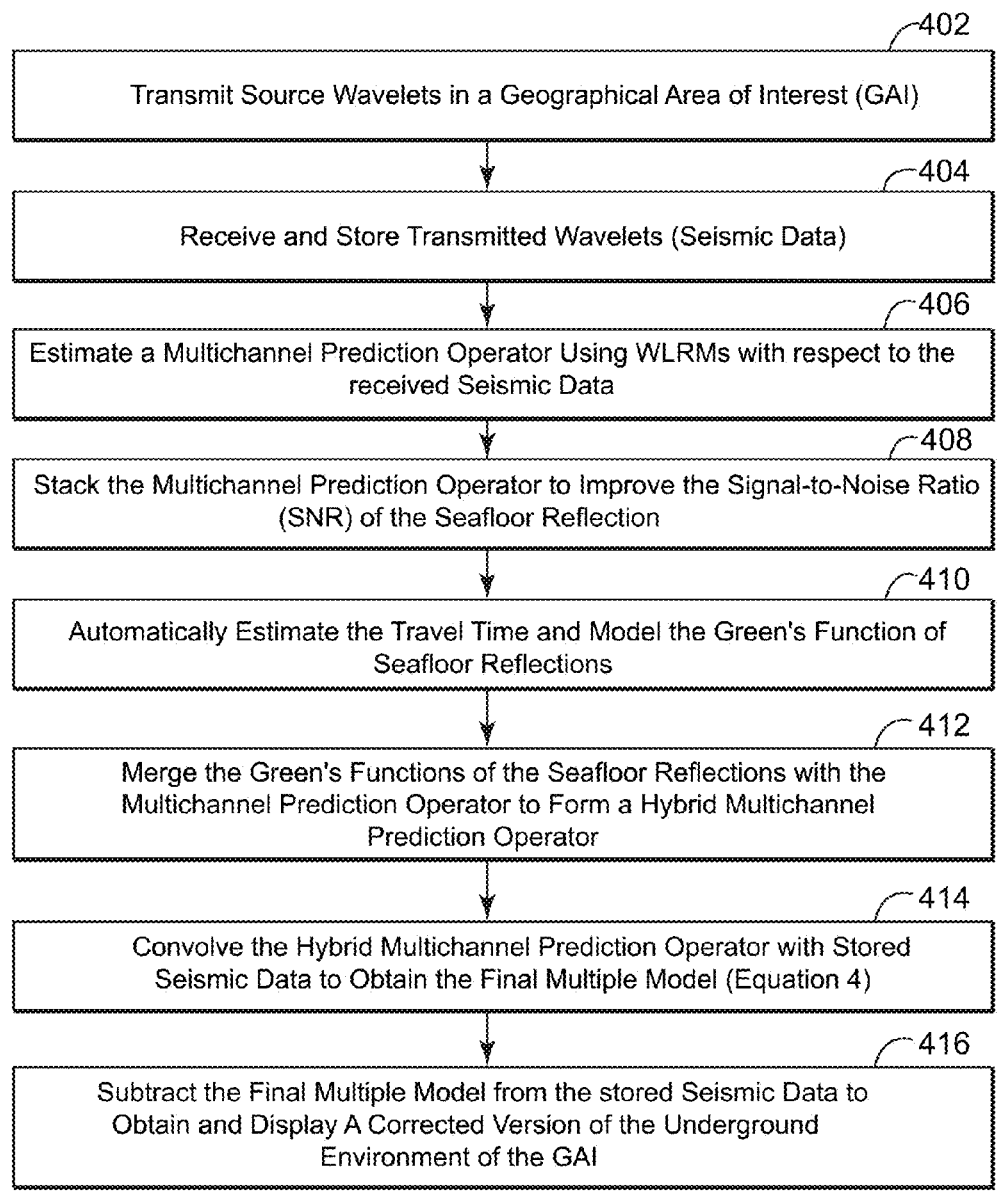

us 9,477,000 B2

1

SYSTEM AND METHOD FOR THE REMOVAL OF SHALLOW WATER MULTIPLES USING A HYBRID MULTI-CHANNEL PREDICTION METHOD

PRIORITY

This application claims benefit under 35 U.S.C. §119(e) from provisional patent application Ser. No. 61/751,573, filed on Jan. 11, 2013, the entire content of which is incorporated herein by reference.

TECHNICAL FIELD

The present invention relates generally to underwater seismic exploration, and more specifically to systems and methods for the removal of shallow water multiples in processing data obtained from such exploration.

BACKGROUND

Seismic waves generated artificially for the imaging of geological layers has been used for more than 50 years. In a marine setting, the most widely used waves are by far reflected waves and more precisely reflected compressional waves, recorded by hydrophones and/or accelerometers. In other settings (e.g. land and ocean bottom surveys), shear wave energy can also be of interest. During seismic prospection operations, vibrator equipment (also known as a "source") generates a vibro-seismic signal that propagates in particular in the form of a wave that is reflected on interfaces of geological layers. These waves are received by geophones, or receivers, which convert the displacement of the ground resulting from the propagation of the waves into an electrical signal recorded by means of recording equipment. Analysis of the arrival times and amplitudes of these waves makes it possible to construct a representation of the geological layers on which the waves are reflected.

A widely used technique for searching for oil or gas, therefore, is the seismic exploration of subsurface geophysical structures. Reflection seismology is a method of geophysical exploration to determine the properties of a portion of a subsurface layer in the earth, which information is especially helpful in the oil and gas industry. Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an on-going process.

The seismic exploration process consists of generating seismic waves (i.e., sound waves) directed toward the subsurface area, gathering data on reflections of the generated seismic waves at interfaces between layers of the subsurface, and analysing the data to generate a profile (image) of the geophysical structure, i.e., the layers of the investigated subsurface. This type of seismic exploration can be used both on the subsurface of land areas and for exploring the subsurface of the ocean floor.

Marine reflection seismology is based on the use of a controlled source that sends energy waves into the earth, by first generating the energy waves in or on the ocean. By measuring the time it takes for the reflections to come back to one or more receivers (usually very many, perhaps in the order of several dozen, or even hundreds), it is possible to estimate the depth and/or composition of the features causing such reflections. These features may be associated with subterranean hydrocarbon deposits.

For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see, FIG. 2, discussed below). The reflected seismic waves propagate upwardly and are detected by receivers 14 provided on streamers 6. This process is generally referred to as "shooting" a particular seafloor area, and the seafloor area can be referred to as a "cell".

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be shown (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction n2, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples, and more strictly, are events that have undergone more than one reflection. Typically, internal multiples, which occur when energy is reflected downward at an interface layer in the subsurface, have a much smaller amplitude than primary reflected waves, because for each reflection, the amplitude decreases proportionally to the product of the reflection coefficients of the different reflectors (usually layers or some sort). As shown in FIG. 3, discussed below, there are several ways for multiples to be generated.

As illustrated in FIG. 3, seismic source 4 produces first transmitted wave 20a that splits into a primary transmitted wave 26a (referred to also as first refracted signal) penetrating inside first subsurface layer 16 (referred to also as "sediment layer" though that does not necessarily need to be the case) under ocean floor 42, and first reflected signal 24a that becomes surface multiple signal 50 after it interfaces with ocean surface 46 (or fourth interface). Second transmitted wave 20b is reflected once at second interface 48 and becomes second reflected signal 24b, and then is reflected down again at ocean floor 42 to become internal multiple signal 51. Internal multiple signal 51 and surface multiple signal 50 also reaches receiver 14, but at different times. Thus, receiver 14 can receive at least several different signals from the same transmitting event: second reflected signal 30a, surface multiple signal 50, and internal multiple signal 51.

As is apparent from FIG. 3, the timing of the received signals will depend on the depth of the ocean 40, its temperature, density, and salinity, the depth of sediment layer 16, and what it is made of.

Thus, receiver 14 can become "confused" as to the true nature of the subsurface environment due to reflected signals 30, and multiple signals 50, 51. As briefly discussed above, other multiples can also be generated, some of which may also travel through the subsurface. A multiple, therefore, is any signal that is not a primary reflected signal. Multiples, as is known by those of ordinary skill in the art, can cause problems with determining the true nature of the geology of the earth below the ocean floor. Multiples can be confused by data acquisition system 10 with first, second or third reflected signals. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

Internal multiple signals 51 typically arise due to a series of subsurface impedance contrasts. They are commonly observed in seismic data acquired in various places, such as the Santos Basin of Brazil. They are often poorly discriminated from the primaries (i.e., the first, second and third reflected signals, among others), because they have similar movement, dips and frequency bandwidth, thereby making attenuation and/or elimination of internal multiple signals 51 (as well as surface multiples 50) one of the key issues in providing clear seismic images in interpreting areas of interest. Over time, various methods have been developed to address this difficult problem and most of them rely on the ability to identify the multiple generators.

The acquisition of data in marine-based seismic methods usually produces different results in source strength and signature based on differences in near-surface conditions. Further data processing and interpretation of seismic data requires correction of these differences in the early stages of processing. Surface-Related Multiples Elimination (SRME) is a technique commonly used to predict a multiples model from conventional flat streamer data. Attenuating the surface-related multiples is based on predicting a multiples model, adapting the multiples model and subtracting the adapted multiples model from the input streamer data.

For marine applications, seismic sources are essentially impulsive (e.g., compressed air is suddenly allowed to expand). One of the most used sources is air guns. The air guns produce a high amount of acoustics energy over a short time. Such a source is towed by a vessel either at the water surface or at a certain depth. The acoustic waves from the air guns propagate in all directions. A typical frequency range of the acoustic waves emitted by the impulsive sources is between 6 and 300 Hz. However, the frequency content of the impulsive sources is not fully controllable and different sources are selected depending on the needs of a particular survey. In addition, the use of impulsive sources can pose certain safety and environmental concerns. Thus, another class of sources that may be used is marine vibratory sources. The marine vibrator (or air gun) can also generally be referred to as a "source," i.e., a source of the sound/energy waves that are transmitted and then reflected/refracted off the ocean floor and then received by one or more, usually dozens, of receivers.

Marine vibrators (herein after referred to as "vibrators," "marine vibrators," and/or "seismic vibrators," or more simply as "sources") can be implemented in what are referred to as "towed arrays" of the plurality of sources and their receivers, wherein each towed array can include numerous vibrators, numerous receivers, and can include several or more groups of receivers, each on its own cables, with a corresponding source, again on its own cable. Systems and methods for their use have been produced for devices that can maintain these cables, for example, in relatively straight lines as they are being towed behind ships in the ocean. As those of ordinary skill in the art can appreciate, an entire industry has been created to explore the oceans for new deposits of hydrocarbons, and has been referred to as "reflection seismology."

Marine vibratory sources, including hydraulically powered sources and sources employing piezoelectric or magneto-strictive material, have been used in marine operations. A marine vibrator generates a long tone with a varying frequency, i.e., a frequency sweep. This signal is applied to a moving port, e.g., a piston, which generates a corresponding seismic wave. Instantaneous pressure resulting from the movement of plural pistons corresponding to plural marine vibrators may be lower than that or an airgun array, but total acoustic energy transmitted by the marine vibrator may be similar to the energy of the airgun array due to the extended duration of the signal. However, such sources need a frequency sweep to achieve the required energy.

It is known by those of skill in the art of seismic exploration that an appropriate choice of frequencies of the frequency sweep is needed to drive the sound producing device that generate seismic waves whose reflections can, in turn, be used to determine the possible or probable location of hydrocarbon deposits under, e.g., the ocean floor. Sweep design pertains to the choice of frequencies used to drive a sound producing device used for determining the possible or probable location of hydrocarbon deposits under, e.g., the ocean floor. A sweep is a sinusoid with a continuously variable frequency, and can be defined by its amplitude A(f), its begin and end frequency, and its sweep rate Sr(f). Provided the sweep is long enough (longer than 5 or 6 seconds), the amplitude spectrum of the sweep at frequency f is proportional to A(f) and to the square root of Sr(f). Target-oriented sweep design (i.e., searching for a particular known type of hydrocarbon, in a particular known type of geological formation) consists in defining A(f) and Sr(f) to obtain the desired Signal-to-Noise ratio (SNR) of the target reflection.

As discussed above, multiples are undesirable "by-products" of underwater seismic exploration that should be eliminated or substantially minimized in order to obtain the best, "truest" representation of the underground geography as possible. One such technique is available for finding and eliminating multiples in shallow water environments. Shallow water is generally those depths that are about 100 meters. The shallow water de-multiple (SWD) technique, based on the concept of multichannel prediction for attenuating surface related short period multiples in shallow water (see, "Shallow Water Demultiple," Hung, B., et al., ASEG, Expanded Abstracts, 1-4[2010]), is generally a robust method, but improvements can be made, especially in regard to the first few order of multiples generated by the seafloor (and any events just beneath the seafloor) when the seafloor is very shallow and hence its reflections are indistinct or in post-critical angle range. In this case, the model of water-layer related multiples (WLRMs) obtained from the convolution of multichannel prediction operators with seismic data is dominated by low frequencies, primarily due to the near-offset extrapolation required for the convolution process. This affects the removal of multiples. Solutions derived from a model-based method (see, "3D Surface-Related Multiple Modeling, Principles and Results," Pica A., et al., 75th Meeting, SEG, Expanded Abstracts, 2080-2083[2005]) have recently been proposed for handling reverberations due to shallow water layer. For instance, the 2011 publication entitled "Model-Based Water-Layer Demultiple," Wang, P., et al., SEG Expanded Abstracts 30, 3551-3555, described a model-based water-layer de-multiple (MWD) method that predicts multiples from a shallow seafloor, overcoming the above-mentioned issue faced by SWD; but at the expense of requiring accurate information of the multiple generators. For practical reasons, only the seafloor is picked, among all the shallow multiple generators, for the application of MWD. For very shallow water environment, however, even the seafloor may not be readily available.

Accordingly, it would be desirable to provide methods, modes and systems for determining a multiple model in shallow water environments, but not necessarily limited thereto, that overcomes the shortcomings of known methods.

SUMMARY

An object of the embodiments is to substantially solve at least the problems and/or disadvantages discussed above, and to provide at least one or more of the advantages described below.

It is therefore a general aspect of the embodiments to provide a system and method for removing all or substantially all shallow water multiples using a hybrid multi-channel predictor that will obviate or minimize problems of the type previously described. According to a first aspect of the embodiments, a method is provided for determining a shallow water multiples model, the method comprising (a) estimating a prediction operator by a shallow water demultiple (SWD) technique using acquired receiver seismic data, (b) generating a multi-channel water layer de-multiple (MWD) primary reflections model using acquired receiver seismic data, and (c) merging said SWD prediction operator with said MWD primary reflection model with said acquired receiver seismic data to determine the shallow water multiples model. According to the first aspect, the step (a) of estimating an SWD prediction operator comprises (a1) generating a series of underwater seismic wavelets by one or more sources, (a2) acquiring seismic data from a plurality of receivers, and storing the seismic data, (a3) using a model of water layer related multiples with respect to said acquired receiver seismic data, and (a4) determining the prediction operator according to the expressions—

$$M = \Delta P w^{-1} P \text{ and}$$

$$M = FP,$$

wherein the SWD prediction operator F is equivalent to $\Delta P$.

According to the first aspect, the step (b) of generating a MWD primary reflections model comprises (b1) estimating a travel time of the transmitted seismic wavelets from one or more sources to each of a plurality of receivers, and (b2) generating the MWD primary reflection model using the estimated travel time and Green's function. Still further according to the first aspect, Green's function is evaluated according to the expression—

$$G(s,r;\omega) = \int G(s,x;\omega) F'(s,x,r) G(x,r;\omega) dx,$$

where s and r are source and receiver locations, respectively, F' is an auto-picked water bottom event from the multichannel prediction operator F at location x, and $\omega$ is frequency.

According to the first aspect, auto-picking is performed using one or more the following criteria: estimation of the time of the water bottom reflection event, amplitude, amplitude ratio, and neighbouring trace information. Still further according to the first aspect, the step (b1) of estimating a travel time of the transmitted seismic wavelets from the one or more sources to each of the plurality of receivers comprises evaluating a second Green's function according to the following expression—

$$G = \frac{j}{4} \times H_0^{(2)}(kr),$$

wherein $j = \sqrt{-1}$, $$k = \frac{\omega}{c},$$

where $\omega$ is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to $\omega \times t$, where t is the travel time, which is the same as distance r divided by velocity c.

According to the first aspect, the step (c) of merging the SWD prediction operator with the MWD primary reflection model with acquired receiver data to determine a shallow water multiples model comprises (c1) merging the generated MWD primary reflection models with the SWD prediction operator to create a hybrid prediction operator and (c2) convoluting the hybrid prediction operator with the acquired receiver data to determine the shallow water multiples model. Still further according to the first aspect, the step of (c1) merging the generated MWD primary reflections models with the SWD prediction operator to create a hybrid prediction operator comprises overlaying Green's function on top of the SWD prediction operator.

According to a second aspect of the embodiment, a method for predicting a shallow water multiples model in seismic receiver data is provided comprising (a) estimating a multi-channel prediction operator F by shallow water demultiple (SWD) technique, (b) generating a model of the Green's functions of the water layer primary reflections, (c) merging the generated water layer primary reflections model with the multi-channel prediction operator F to create a hybrid multi-channel prediction operator $F_H$, and (d) convolving the hybrid multi-channel prediction operator $F_H$ with receiver data to determine the shallow water multiples model.

Still further according the second aspect, the step (a) of estimating a multi-channel prediction operator F by shallow water demultiple (SWD) technique comprises (a1) generating a series of underwater seismic wavelets by one or more sources, (a2) acquiring seismic data from a plurality of receivers, and storing the seismic data, (a3) using a model of water layer related multiples with respect to said acquired receiver seismic data, and (a4) determining the multi-channel prediction operator F according to the expressions—

$$M = \Delta P w^{-1} P \text{ and}$$

$$M = FP,$$

wherein the multi-channel prediction operator F is equivalent to $\Delta P$.

According to the second aspect, step (b) of generating a model of the Green's functions of the water layer primary reflections comprises (b1) estimating a travel time of the transmitted seismic wavelets from one or more sources to each of a plurality of receivers, and (b2) generating the model of the Green's functions of the water layer primary reflections using the estimated travel time and Green's function. Still further according to the second aspect, Green's function is evaluated according to the expression—

$$G(s,r;\omega) = \int G(s,x;\omega) F'(s,x,r) G(x,r;\omega) dx,$$

where s and r are source and receiver locations, respectively, F' is an auto-picked water bottom event from the multichannel prediction operator F at location x, and $\omega$ is frequency.

According to the second aspect, auto-picking is performed using one or more the following criteria: estimation of the time of the water bottom reflection event, amplitude, amplitude ratio, and neighbouring trace information. Still further according to the second aspect, step (b1) of estimating a travel time of the transmitted seismic wavelets from the one or more sources to each of the plurality of receivers comprises evaluating a second Green's function according to the following expression—

$$G = \frac{j}{4} \times H_0^{(2)}(kr),$$

wherein $j = \sqrt{-1}$, $$k = \frac{\omega}{c},$$

where $\omega$ is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to $\omega \times t$, where t is the travel time, which is the same as distance r divided by velocity c.

According to the second aspect, step (c) of merging the generated water layer primary reflections model F with the multi-channel prediction operator F to create a hybrid multi-channel prediction operator $F_H$, comprises overlaying Green's function on top of the prediction operator. Still further according to the second aspect, the method further comprises (e) generating an output seismic wave signal of the GAI by subtracting the final multiples model from the received and stored seismic data, and (f) displaying the generated output seismic wave signal as representative of a floor of a shallow body of water environment.

According to a third aspect of the embodiment, a method for determining shallow water multiples when seismically exploring a geographical area of interest under a body of water is provided comprising (a) generating a series of underwater seismic wavelets by one or more sources, (b) acquiring seismic data from a plurality of receivers, and storing the seismic data, (c) estimating a multi-channel prediction operator F using a model of water layer related multiples with respect to the received and stored seismic data, (d) estimating a travel time of the transmitted seismic wavelets from the one or more sources to each of the plurality of receivers, (e) generating water layer primary reflections models using the estimated travel time and Green's function, (f) merging the generated water layer primary reflections models with the multi-channel prediction operator F to create a hybrid multi-channel prediction operator $F_H$, and (g) convoluting the hybrid multi-channel prediction operator $F_H$ with the stored received data to determine a final multiples model. According to the third aspect, the method further comprises (h) generating an output seismic wave signal of the GAI by subtracting the final multiples model from the received and stored seismic data, and (i) displaying the generated output seismic wave signal as representative of a floor of a shallow body of water environment.

According to the third aspect, the method still further comprises (j) stacking the multi-channel prediction operator F to improve a signal-to-noise ratio (SNR) of reflections off a seafloor, and wherein Green's function is evaluated according to the expression—

$$G(s,r;\omega) = \int G(s,x;\omega) F'(s,x,r) G(x,r;\omega) dx,$$

where s and r are source and receiver locations, respectively, F' is an auto-picked water bottom event from the multichannel prediction operator F at location x, and ω is frequency.

According to the third aspect, auto-picking is performed using one or more the following criteria: estimation of the time of the water bottom reflection event, amplitude, amplitude ratio, and neighbouring trace information. Still further according to the third aspect, the step of (f) merging the generated water layer primary reflections models with the multi-channel prediction operator F to create a hybrid multi-channel prediction operator $F_H$ comprises overlaying the Green's function on top of the multichannel prediction operator F.

According to the third aspect, the step of (c) estimating a multi-channel prediction operator F using a model of water layer related multiples with respect to the received and stored seismic data comprises determining the multichannel prediction operator F according to the expressions—

$$M = \Delta P w^{-1} P \text{ and}$$

$$M = FP,$$

and wherein the multichannel prediction operator F is equivalent to ΔP.

According to the third aspect, the step of (d) estimating a travel time of the transmitted seismic wavelets from the one or more sources to each of the plurality of receivers comprises: evaluating a second Green's function according to the following expression—

$$G = \frac{j}{4} \times H_0^{(2)}(kr),$$

wherein $j = \sqrt{-1}$, $$k = \frac{\omega}{c},$$

where ω is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to ω×u, where t is the travel time, which is the same as distance r divided by velocity c.

According to a fourth aspect of the embodiments, a system is provided for determining shallow water multiples when seismically exploring a geographical area of interest under a body of water, the system comprising a processor configured to estimate a multi-channel prediction operator F using a model of water layer related multiples with respect to received and stored seismic data, estimate a travel time of the transmitted seismic wavelets from the one or more sources to each of the plurality of receivers, generate a water layer primary reflections models using the estimated travel time and Green's function, merge the generated water layer primary reflections models with the multi-channel prediction operator F to create a hybrid multi-channel prediction operator $F_H$, and convolute the hybrid multi-channel prediction operator $F_H$ with the stored received data to determine a final multiples model.

According to the fourth aspect, the processor is further configured to generate an output seismic wave signal of the GAI by subtracting the final multiples model from the received and stored seismic data, and generate a display signal for a display to display the generated output seismic wave signal as representative of a floor of a shallow body of water environment. Still further according to the second aspect, the processor is further configured to stack the multi-channel prediction operator F to improve a signal-to-noise ratio (SNR) of reflections off a seafloor, and Green's function is evaluated by the processor according to the expression—

$$G(s,r;\omega) = \int G(s,x;\omega) F'(s,x,r) G(x,r;\omega) dx,$$

where s and r are source and receiver locations, respectively, F' is an auto-picked water bottom event from the multichannel prediction operator F at location x, and ω is frequency.

According to the fourth aspect, auto-picking is performed by the processor using one or more the following criteria: estimation of the time of the water bottom reflection event, amplitude, amplitude ratio, and neighbouring trace information, and further wherein when the processor merges the generated water layer primary reflections models with the multi-channel prediction operator F to create a hybrid multi-channel prediction operator $F_H$, the processor is further configured to overlay the Green's function on top of the multichannel prediction operator F.

According to the fourth aspect, wherein when the processor estimates a multi-channel prediction operator F using a model of water layer related multiples with respect to the received and stored seismic data, the processor is further configured to determine the multichannel prediction operator F according to the expressions—

$$M = \Delta P w^{-1} P \text{ and}$$

$$M = FP,$$

and wherein the multichannel prediction operator F is equivalent to ΔP.

According to the fourth aspect, wherein when the processor estimates a travel time of the transmitted seismic wavelets from the one or more sources to each of the plurality of receivers, the processor is further configured to evaluate a second Green's function according to the following expression—

$$G = \frac{j}{4} \times H_0^{(2)}(kr),$$

wherein $j = \sqrt{-1}$, $$k = \frac{\omega}{c},$$

where ω is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to ω×t, where t is the travel time, which is the same as distance r divided by velocity c.

According to the fourth aspect, the system further comprises one or more sources configured to generate a series of underwater seismic wavelets, and a plurality of receivers configured to acquire seismic data resulting from the generated series of underwater seismic wavelets, and a memory configured to store the seismic data.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein:

FIGS. 2 and 3 illustrate a side view of the data acquisition system of FIG. 1 and pictorially represents transmitted, reflected, refracted and multiples sound waves;

FIG. 4 illustrates a flow chart of a method for determining shallow water multiples using a hybrid multichannel prediction method according to an embodiment;

DETAILED DESCRIPTION

Figure 1:
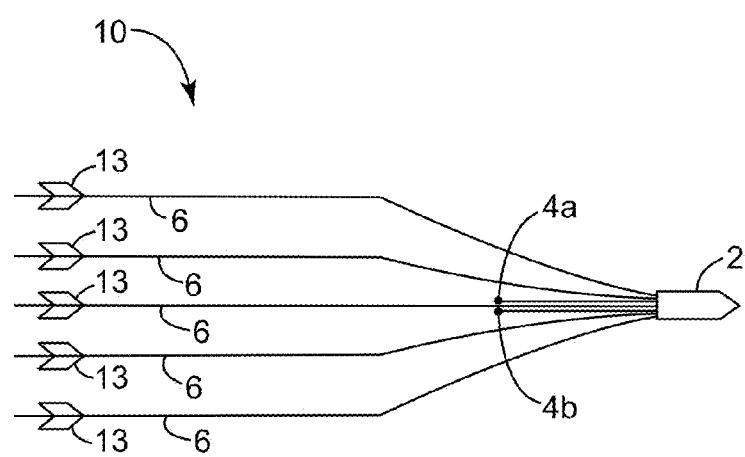
FIG. 1 illustrates a top view of a data acquisition system for use in an underwater seismic gathering process.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a towed seismic underwater array. However, the embodiments to be discussed next are not limited to these systems but may be applied to other land based systems that can also be affected by shallow water environments.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: universal serial bus (USB); high speed interchip (HSIC); consumer electronics (CE); personal computer (PC); system-on-chip (SoC); USB transceiver macro-cell interface (UMTI+); UTMI+ low pin count interface (ULPI); physical transceiver (PHY); printed circuit board (PCB); signal-to-noise ratio (SNR); shallow water de-multiple (SWD); water-layer related multiples (WLRMs); model-based water-layer de-multiple (MWD); and surface related multiple elimination (SRME).

Figure 9:
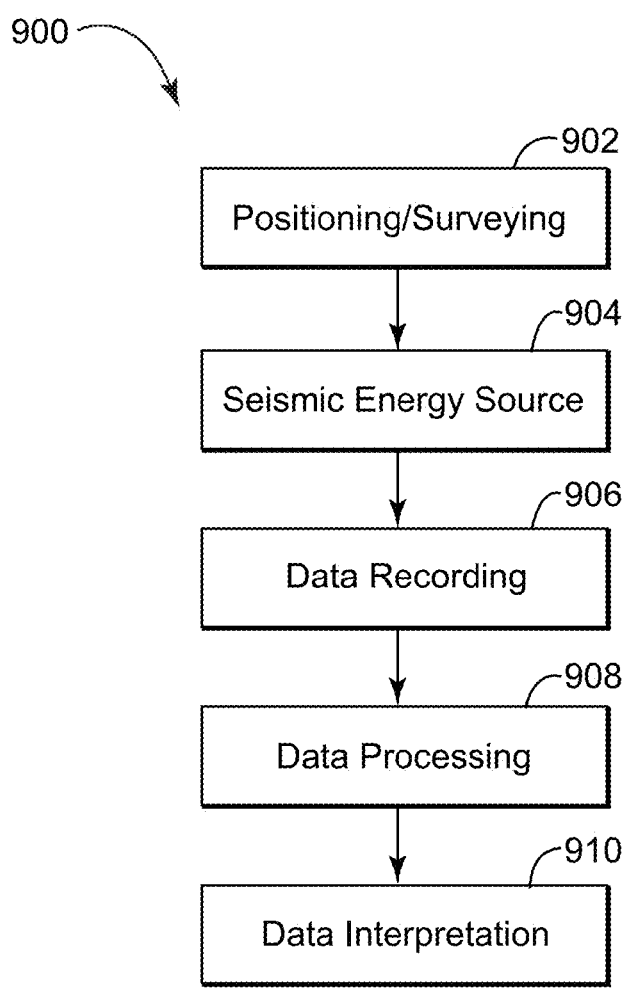
FIG. 9 illustrates a general method for seismic exploration according to an embodiment.

As generally discussed above, the main purpose of seismic exploration is to render the most accurate possible graphic representation of specific portions of the Earth's subsurface geologic structure (also referred to as a GAI). The images produced allow exploration companies to accurately and cost-effectively evaluate a promising target (prospect) for its oil and gas yielding potential (i.e., hydrocarbon deposits 44). FIG. 9 illustrates a general method for seismic exploration (method 900). There are five main steps: a detailed discussion of any one of the process steps would far exceed the scope of this document, but a general overview of the process should aid in understanding where the different aspects of the embodiments can be used. Step 902 of method 900 involves positioning and surveying of the potential site for seismic exploration. In step 904, a determination of what type of seismic energy source should be used, and then causing seismic signals to be transmitted. While method 900 applies equally to both marine and land seismic exploration systems, each will use different types of equipment, especially in generating seismic signals that are used to develop data about the Earth's subsurface geologic structure. In step 906, data recording occurs. In a first part of this step, receivers 14, 64 receive and most often digitize the data, and in a second part of the step 906, the data is transferred to a recording station. In step 908, data processing occurs. Data processing generally involves enormous amounts of computer processing resources, including the storage of vast amounts of data, multiple processors or computers running in parallel. Finally, in step 910, data interpretation occurs and results can be displayed, sometimes in two-dimensional form, more often now in three dimensional form. Four dimensional data presentations (a 3D plot or graph, over time (the fourth dimension) are also possible, when needed to track the effects of other processes, for example.

According to embodiments, a hybrid approach is presented that combines the strengths of SWD and model-based methods to substantially eliminate shallow water multiples from obtained data. According to an embodiment, a multichannel prediction operator estimated by SWD can be used as a substantially accurate kinematic representation of the seafloor reflection with a higher signal-to-noise ratio (SNR), allowing the travel time of the seafloor to be automatically estimated. With this information, the Green's functions of water-layer primary reflections can be modeled and used for multiple prediction and removal. The effectiveness of the disclosed system and method on synthetically generated data, as well as on field data acquired offshore Australia, is discussed below.

According to a further embodiment, a general method can be summarized as first estimating the multi-channel prediction operator using the WLRMs in the received data. Then, stacking the operator is performed to improve the SNR of the seafloor reflection. An estimation is then performed of the travel time (from source to seafloor to receiver), which then allows modeling of Green's function of seafloor reflections. The output of Green's function is then merged with the statistical operator of the SWD technique, and that output (which can be referred to as a "hybrid multi-channel prediction operator") is convoluted with the data obtained at the receiver to obtain the final multiple model, which is then subtracted from the original data to arrive at the true underground underwater seismic wave data. The underground underwater seismic wave data is a representation of, in this case, the underground geography under the water when the water is such that it is classified as being "shallow water" as discussed above.

The DELPHI feedback model, discussed in "Removal of Internal Multiples with the Common-Focus-Point (CFP) Approach: Part 1—Explanation of the Theory," Verschuur D. J., et al., Geophysics 70, V45 [2005], forms the basis of surface related multiple elimination (SRME). In practice, the prediction is usually the first step of SRME, and in the form of $$M = \Delta P w^{-1} P \quad (1)$$

where M is the multiple model (i.e., the desired output), $\Delta P$ is the primary response, P is the acquired seismic data, and w is a source wavelet. The multiples' prediction model can be formulated in another way, as discussed in "MAGIC: Shell's Surface Multiple Attenuation Technique," Biersteker J., 71st Meeting, SEG, Expanded Abstracts, 1301-1304 [2001], and as such, describes it as a multichannel prediction problem:

$$M = FP; \|M - FP\|_{min}^2 \quad (2),$$

where F is the time and offset truncated multichannel prediction operator, which can be estimated by minimizing the prediction error between seismic data P and multiple M.

Comparing Equation (2) with the SRME formulation in Equation (1), the multichannel prediction operator F is equivalent to a scaled version of the primary response, $\Delta P$ (see, "Surface Multiple Attenuation in Shallow Water and the Construction of Primaries from Multiples," Hargreaves N., 76th Meeting, SEG, Expanded Abstracts, 2689-2693 [2006]); this property can be used in performing MWD, but instead of requiring a known water-layer model, embodiments derive the Green's function of the water-layer reflections by utilizing the travel time information of the multichannel prediction operator F estimated from SWD in Equation (2), such that the modelled Green's function is expressed as:

$$G(s,r;\omega) = \int G(s,x;\omega) F'(s,x,r) G(x,r;\omega) dx \quad (3),$$

where s and r are source and receiver locations, respectively; F' is the auto-picked water bottom event from the multichannel prediction operator F at location x, and $\omega$ is frequency. The water bottom is the reflection of the transmitted seismic wave off the water floor, typically, a shallow water location. The method discussed herein auto-picks the water bottom event using one or more of the following criteria: estimation of the time of the water bottom reflection event; amplitude; amplitude ratios; and neighbouring trace information. Such means for auto-picking the water bottom event are known to those of skill in the art of the embodiments disclosed herein.

With this approach, the multiples model can be predicted using the one way version of the Kirchhoff integral (see, "One-way Version of the Kirchhoff Integral," Geophysics, Berkhout, A. J., et al., 54(4), 460-467 [1989]) in the form of:

$$M = \frac{1}{2\pi} \oint P \vec{\nabla} G dS. \quad (4)$$

Equation (4) does not suffer from spectral distortion because the indistinctly recorded seafloor event is now modelled in an automatic sense by the corresponding Green's function. The Green's function provides improved spectral clarity for at least the following reasons. Picking a definite time provides an improved and more accurate Green's function, which is, of course, an accurate general solution of the wave equation. Because the water bottom events can be considered as a smeared water bottom time, and consist of waves that occupy one wave length, picking one point in time provides an accurate time point upon which to "anchor" or base the results of the Green's function upon. Therefore, an accurate time point provides an accurate Green's function that provides an accurate solution that results in substantially little or no spectral distortion.

To model those multiple generating events beneath the seafloor, the embodiments make use of the fact that the multichannel prediction operator F can contain more than one multiple generating event. Thus, SWD can model multiples with more than single periodicity. As known by those of skill in the art, each of multiple generator generates a multiple at a certain periodicity. Therefore, a single periodicity corresponds to a single multiple generator. While there is no limit to the number of periodicities, in order for them to be considered shallow water multiples, the limitation is that they must be shallow, or the periodicity is short.

Figures 5A, 5B, 5C, 5D, 5E, 5F:
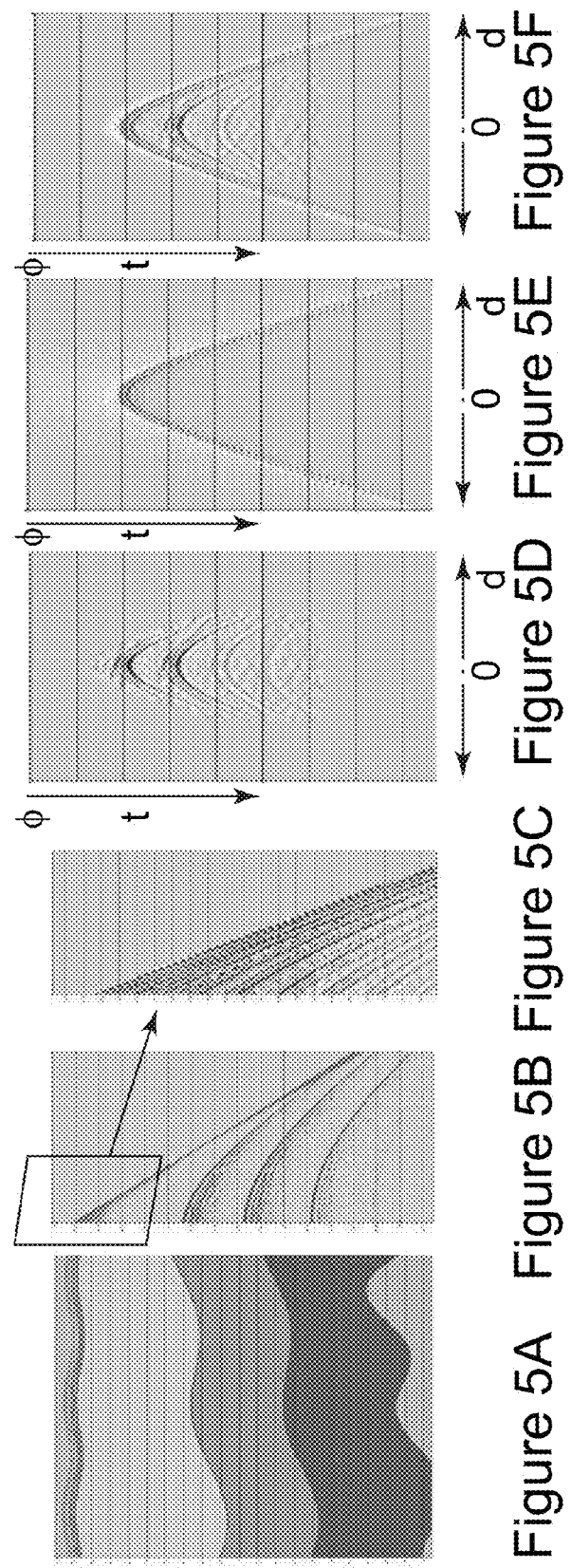
FIGS. 5A-5F illustrate operation of the method of FIG. 4 on synthetic data.

Comparing Equation (4) with Equation (2), the multichannel prediction operator F is also equivalent to the discrete directional derivative of Green's function. According to a further embodiment, therefore, the multichannel prediction operator F can be merged with the Green's function of seafloor reflections to form a hybrid multichannel prediction operator $F_H$ such that it compensates for the missing high dips of the original multichannel prediction operator F and contains more than the seafloor event as a multiples generating event, as was originally represented by Green's function. Skipping ahead briefly to FIG. 5, high dips are best described as shown in FIG. 5E, which is discussed in greater detail below, in that the high dips are the ideal operator shown in FIG. 5E that is missing from FIG. 5D. According to an embodiment, a high dip can also be described as a characteristic of an event trace. In FIG. 5E the horizontal axis is distance and the vertical axis is time. Visual velocity is a descriptor of the trace event as it moves in distance over time. For example, in FIG. 5E, the trace event moves less in space or distance, and takes more time as it approaches the edges. Therefore, it has slow visual velocity. The event has slow visual velocity in that it move less in space or distance over a longer period of time, as indicated by the spreading out of the trace event. According to an embodiment, if the tangent of the trace event in FIG. 5 the absolute value of the tangent is high for high dips, which is the area near the edge of the trace event, as was discussed above. The method of SWD, which is trying to solve an inversion problem, obtains FIG. 5D at its best, meaning that it is limited in both time and space.

Attention is now directed back to FIG. 4, wherein method 400 according to an embodiment is illustrated that develops a multiples model for use in more accurately describing a geographical area of interest, in particular for use in shallow water environments. According to a further embodiment, method 400 applies equally well to both fresh, brackish, and salt water environments. Method 400 begins with step 402, wherein one or more sources 4 transmit a plurality of source wavelets 30, as shown in FIG. 1, above a geographical area of interest (GAI), especially in a shallow water environment. In step 404, the transmitted wavelets 30 that have been reflected and refracted off ocean floor 42 and/or different layers 16, as well as multiples 51, are received by one or more receivers 14, and then the data is stored, as seismic data, usually, but not restrictively, in digital form, in seismic data acquisition system 200, as discussed in greater detail below, in regard to FIG. 8.

Following the storage of seismic data in seismic data acquisition system 200 in step 404, method 400 then proceeds to manipulate the seismic data in order to generate the multiples model. In step 406, method 400 uses WLRMs to estimate a multichannel prediction operator F in regard to the received seismic data.

As used herein, time and offset truncation refers to the mathematical nature and features of the multichannel prediction operator F. In an ideal situation, the multichannel prediction operator F would always show what is seen in FIG. 5E, but instead all that is achieved is what is seen in FIG. 5D. That is, in FIG. 5D, the image is truncated in the vertical (time) sense, as well as being "offset" (i.e., horizontally truncated). According to an embodiment, the multichannel prediction operator F described previously can be more accurately described as a time and offset truncated multichannel prediction operator F.

In step 406, method 400 stacks the estimated multichannel prediction operator F to improve the signal-to-noise ratio (SNR) of the seafloor reflection. According to an embodiment, stacking of the multichannel prediction operator F includes alignment of, and summing of, the different values of the estimated multichannel prediction operator F. In step 410, method 400 automatically estimates the travel time, and using this information, models the Green's function of seafloor reflections. According to an embodiment, estimation of the travel time includes evaluation of a slightly different embodiment of the Green's function that is dependent on time, as those of skill in the art can appreciate. The further embodiment of Green's function, shown as Equation 3', for 2D wave equation is represented as:

$$G = \frac{j}{4} \times H_0^{(2)}(kr) \quad (3')$$

wherein $j=\sqrt{-1}$, and $$k = \frac{\omega}{c},$$

where $\omega$ is frequency, c is velocity, r is the distance from source to receiver, and $H_0^{(2)}$ is the $0^{th}$ order Hankel function of the second kind. The variable "kr" is equal to $$\frac{\omega}{c} \times r,$$

which is equal to $\omega \times t$, where t is the travel time, which is the same as distance r divided by velocity c. According to an embodiment, the seismic wave used in method 400 never directly travels from source to receiver. As those of skill in the art can appreciate, Equation 3 describe the Green's function from source to receiver, and can be decomposed into two parts; one is Green's function from source to water bottom, and the other is Green's function from water bottom to receiver. Equation 3', however, according to an embodiment, describes how Green's function is evaluated for wave travel directly from one point to another point.

Following step 410, method 400 then performs step 412, in which the modelled Green's function determined in step 412 is merged with the multichannel prediction operator F determined in step 406 to form a hybrid multichannel prediction operator $F_H$. As discussed above, the hybrid multichannel prediction operator $F_H$ overcomes the deficiencies of previously determined multichannel prediction operators in that it compensates for the missing high frequency information, can contains even more seafloor events, than that as represented by the Green's function. According to a further embodiment, Green's function of the water layer reflection as embodied by Equation (2) provides a solution, however ideal, for a single event. According to a further embodiment, the multichannel prediction operator F provides solutions for more than a single event, but none of them are ideal. According to a further embodiment, merging of the modelled Green's function determined in step 412 with the multichannel prediction operator F determined in step 406 to determine the hybrid multichannel prediction operator $F_H$ is accomplished by overlaying the Green's function on top of multichannel prediction operator F, or, according to a further embodiment, reversing the overlay, i.e., overlaying the multichannel prediction operator F on top of Green's function Then, in step 414, method 400, using Equation 4, performs a convolution of the hybrid multichannel prediction operator $F_H$ with the original seismic data, obtained in step 404, to produce a final multiples model. Recalling from the discussion above that multiples are essentially noise, and need to be minimized to the greatest extent possible, as is accomplished according to the embodiments discussed herein, method 400 proceeds to step 416 wherein sophisticated methods are used to subtract the multiples from the original seismic data to produce a substantially multiples free set of seismic data that accurately depicts the underground environment of the GAI in shallow water areas. According to an embodiment, such methods of subtraction can include a least square adaptive subtraction, using an L1 or L2 norm, or curvelet domain adaptive subtraction, among other methods, as known to those of skill in the art.

As those of skill in the art can now appreciate, the embodiments described here provides for enhanced shallow water multiple determination and finds short period multiples with more than single periodicity without the need of manual picking the seafloor events.

FIGS. 5A-5F illustrate operation of the method of FIG. 4 on synthetic data, and shows that the multichannel prediction operator estimated from WLRMs is equivalent to Green's function of shallow reflectors. FIG. 5A is the reflectivity model that was used to generate the synthetic data. FIG. 5B shows a shot gather that has the nearest offset of 250 m and a magnified section of the shallow part shown in FIG. 5C. There are three shallow reflectors, but the reflections showed in the magnified section are smeared together. The area highlighted by the black dashed line in FIG. 5B was used to estimate the multichannel prediction operator, which is shown in FIG. 5D; note that all three shallow reflectors are reconstructed correctly. FIG. 5E shows the Green's function of the seafloor reflections estimated by using the seafloor travel time information derived from FIG. 5D. Finally, FIG. 5F shows the hybrid multichannel prediction operator $F_H$ by merging the two operators shown in FIGS. 5D and 5E. The hybrid multichannel prediction operator $F_H$ has a better defined seafloor reflection in time and offset, and includes the other two events of FIG. 5D. The first event shown in FIGS. 5D and 5F (i.e., the topmost trace event) and the only trace event shown in FIG. 5E are all seafloor reflections. In FIGS. 5D-5F, the horizontal direction is spatial offset (with zero offset being at the center of the Figures), representing the distance between the source and receiver and the vertical direction is time.

Turning now to two sets of field data, FIGS. 6A-6E illustrate operation of the method of FIG. 4 on data taken off a first section of coast of Australia, FIGS. 7A-7D illustrate operation of the method of FIG. 4 on data taken off a second section of coast of Australia.

Figure 2:
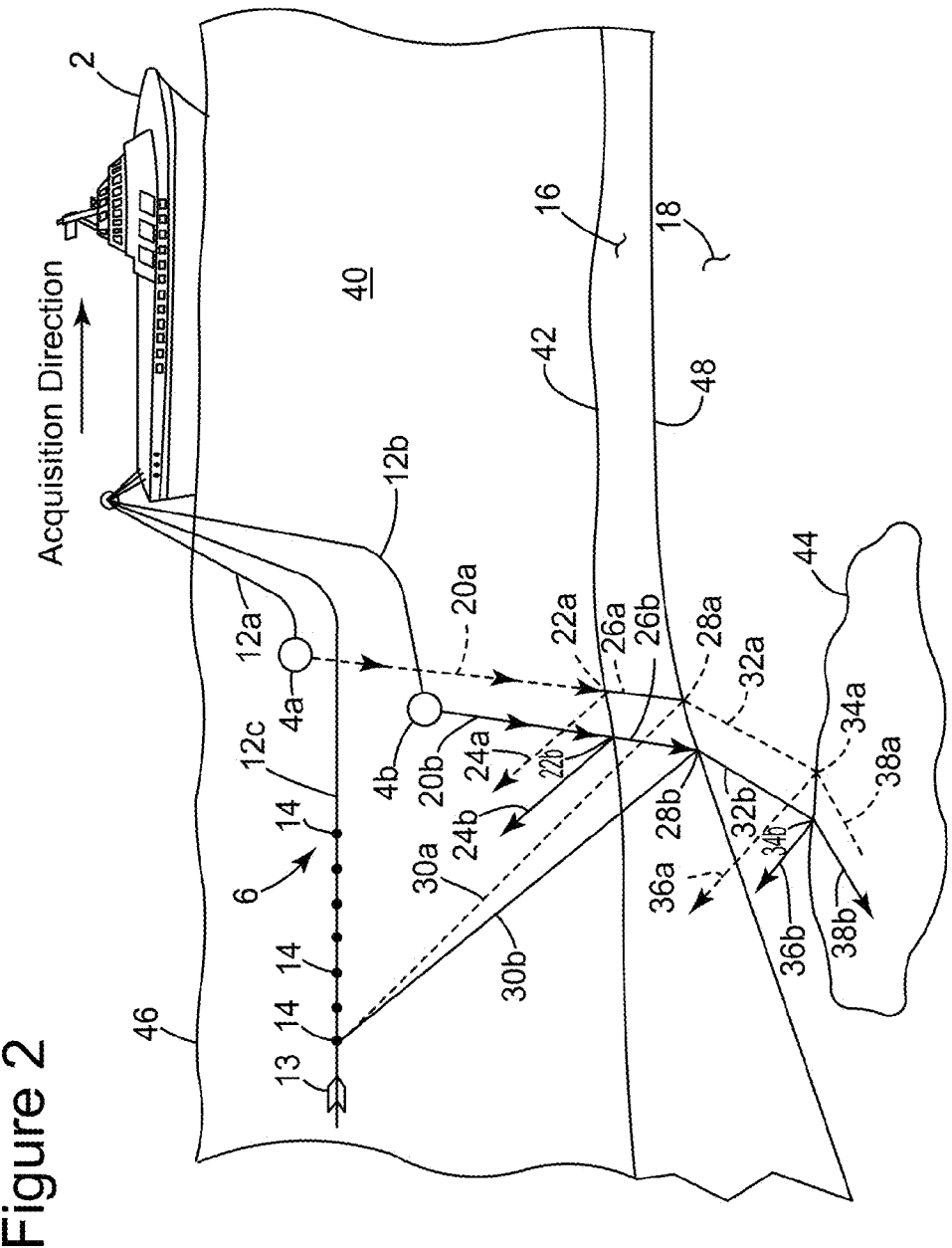

In regard to FIGS. 6A-6E, the first field data example is a line acquired offshore Australia. FIG. 2a displays a near offset stack section. The presence of the reef gives rise to strong short-period free-surface multiples. The seafloor is at a depth of around 30 m in the middle of the line and the acquired nearest offset is 180 m, which makes the reflections in post-critical range even for the nearest offset. Consequently, the auto-correlation plot (FIG. 6B), a commonly used method for estimating the periodicity of the multiples, fails to reveal the travel time of the seafloor reflections. Hence, it is difficult, if not impossible; to identify the seafloor event for the calculation of its associated Green's function.

Figure 6A:
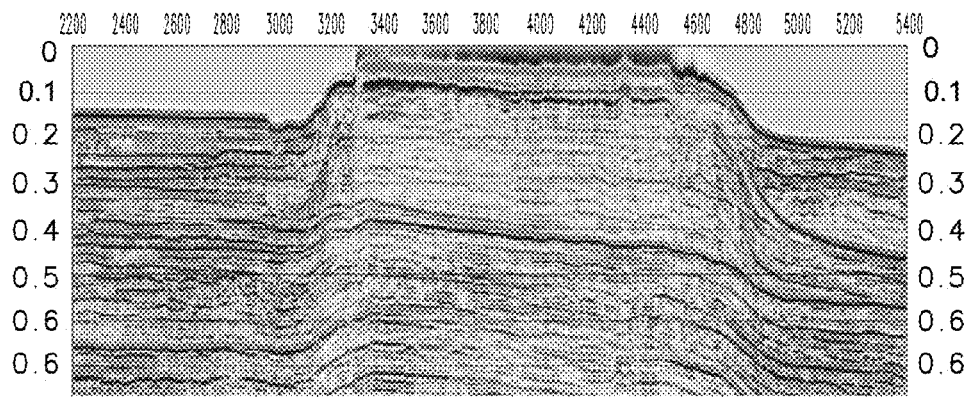
FIGS. 6A-6E illustrate operation of the method of FIG. 4 on data taken off a first section of coast of Australia.
Figure 6B:
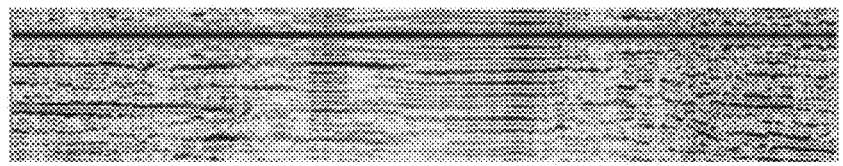
Figure 6C:
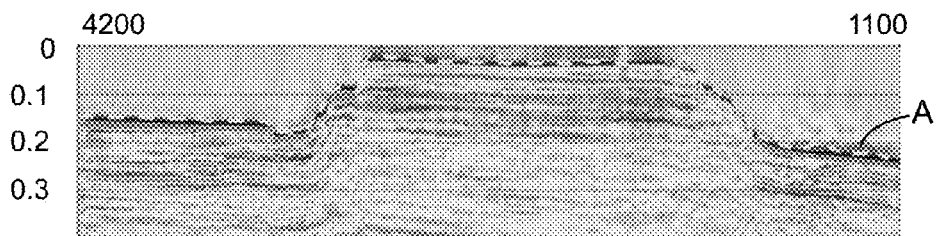
Figure 6D:
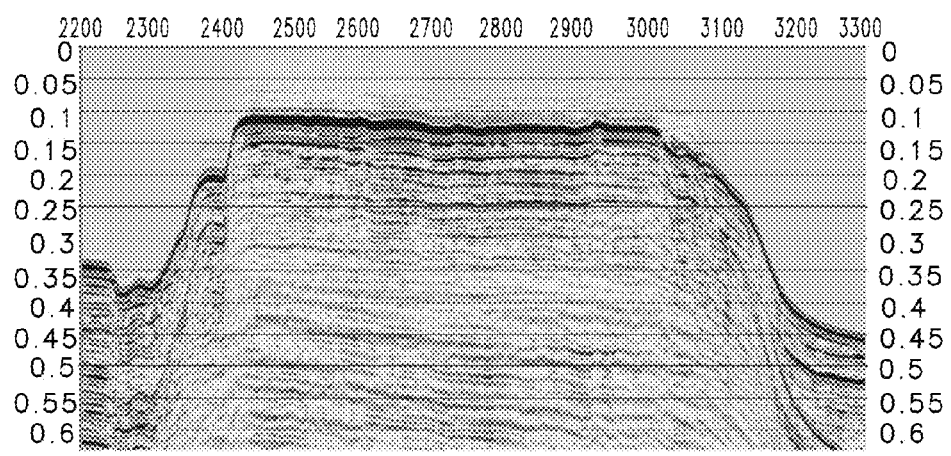
Figure 6E:
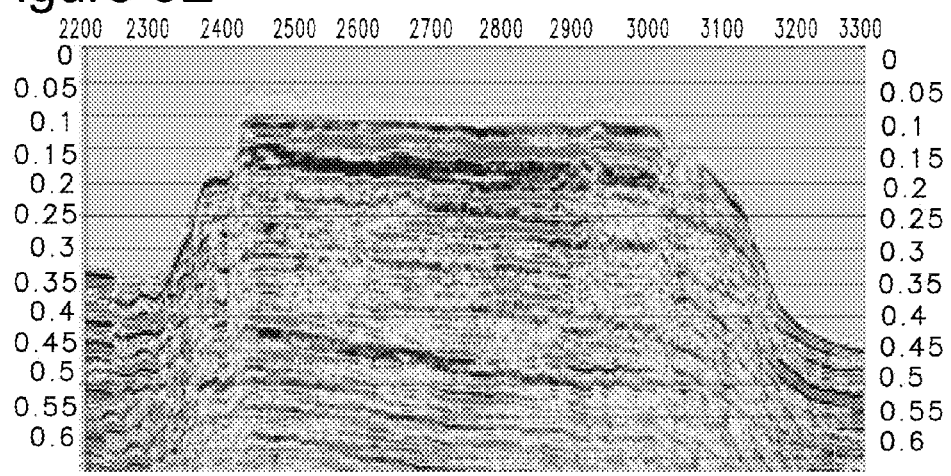

Following the steps described above, the multichannel prediction operator F was estimated from the WLRMs (see FIG. 6C). As can be observed, it is now much easier to pick the water bottom event because it is much better defined with enhanced S/N ratio. Dashed line A in FIG. 6C indicates the auto-picked result. With this travel time information, the Green's function of the seafloor reflections can then be modelled. The resulting Green's function and the operator F were then merged and convolved with the data for modelling of the multiples. FIG. 6D displays the multiple model obtained by this hybrid approach. Comparing FIG. 6D with the model in FIG. 6E, which was predicted by the SWD approach, it can be seen that the hybrid method has much less spectral distortion. It is evident that method 400 according to an embodiment overcomes the issue faced by SWD when the seafloor reflections are not properly recorded.

Figure 7B:
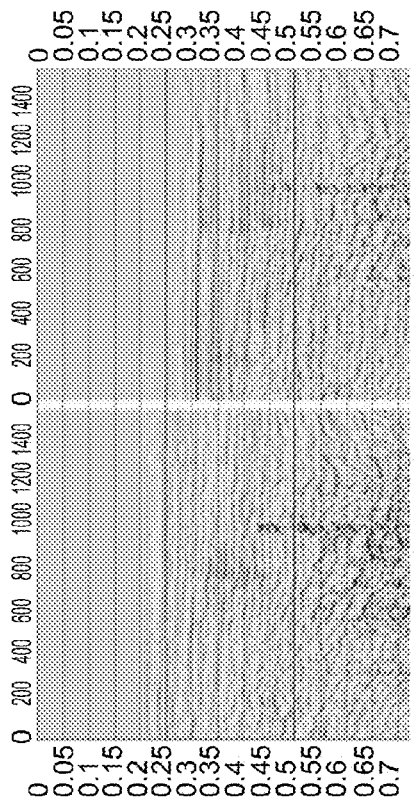
FIGS. 7A-7D illustrate operation of the method of FIG. 4 on data taken off a second section of coast of Australia.
Figure 7A:
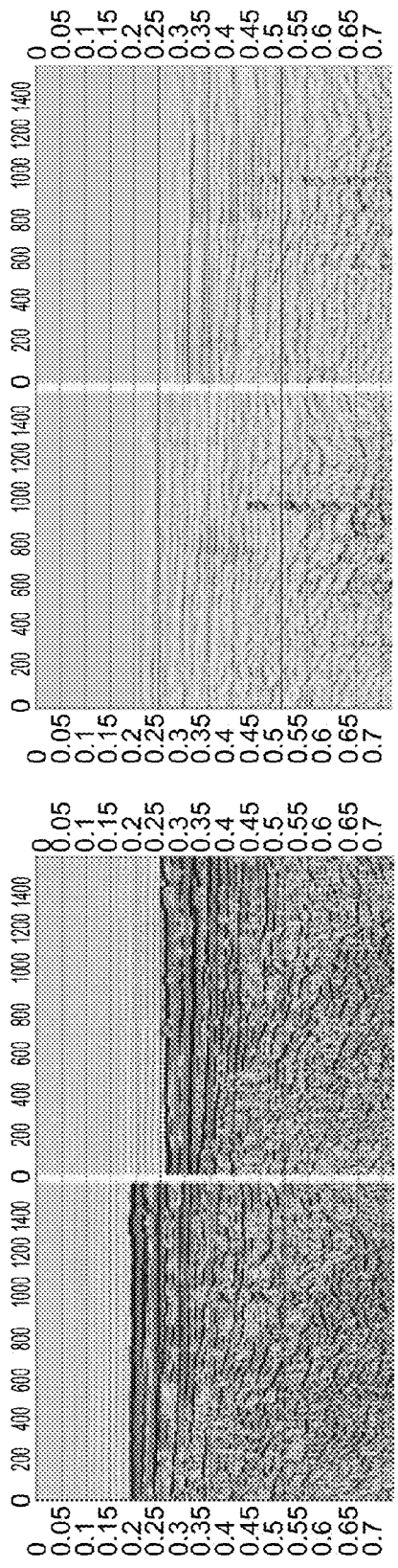
Figure 7D:
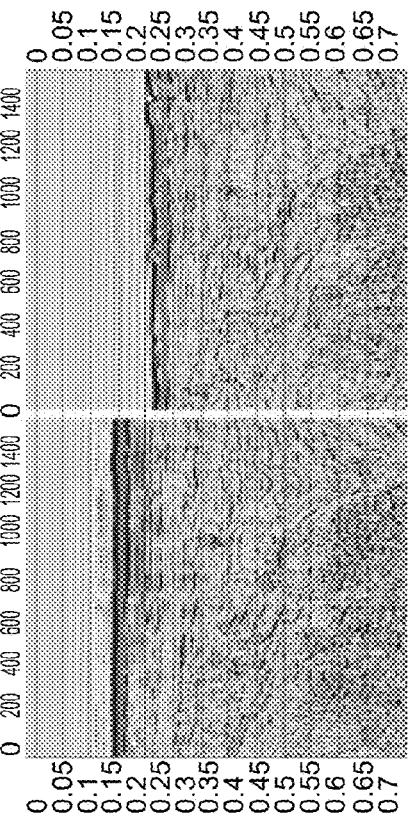
Figure 7C:
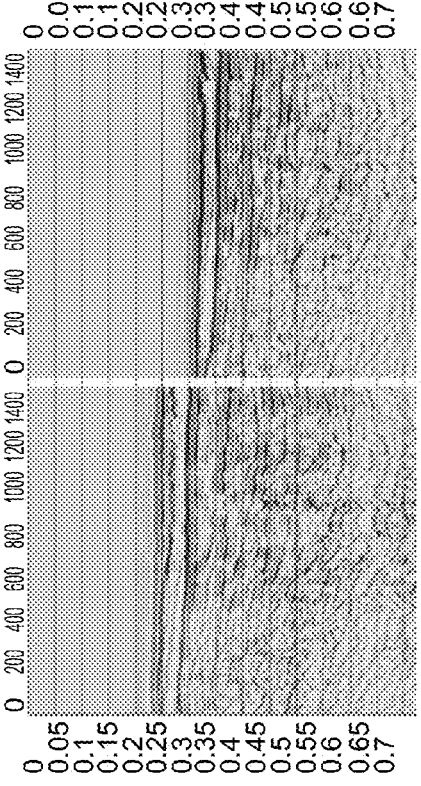

The second field data example comes from another part of offshore Australia. FIG. 7A shows two common channel sections of the input data. FIGS. 7B and 7C display the multiple models obtained by the hybrid approach (left graph of the Figures) and SWD approach (right graph of the Figures), respectively. The adaptive subtraction results using the hybrid model are shown in FIG. 7D (left graph shown the hybrid approach and the right graph the SWD approach). The WLRMs are mostly attenuated by the hybrid method because the multiple model is much better defined.

The embodiments and illustrative examples discussed and described herein have demonstrated that multichannel prediction operators estimated from water layer related multiples provides a good solution in modelling seafloor reflections when they are not distinctly recorded in seismic data. The multichannel prediction operator is a substantially accurate kinematic representation of the seafloor reflection and can be used for modelling the corresponding Green's function. Combining this Green's function with the multichannel prediction operator, it has been demonstrated that this hybrid approach provides superior performance in suppressing water layer related multiples for shallow water data in comparison with conventional means.

Figure 8:
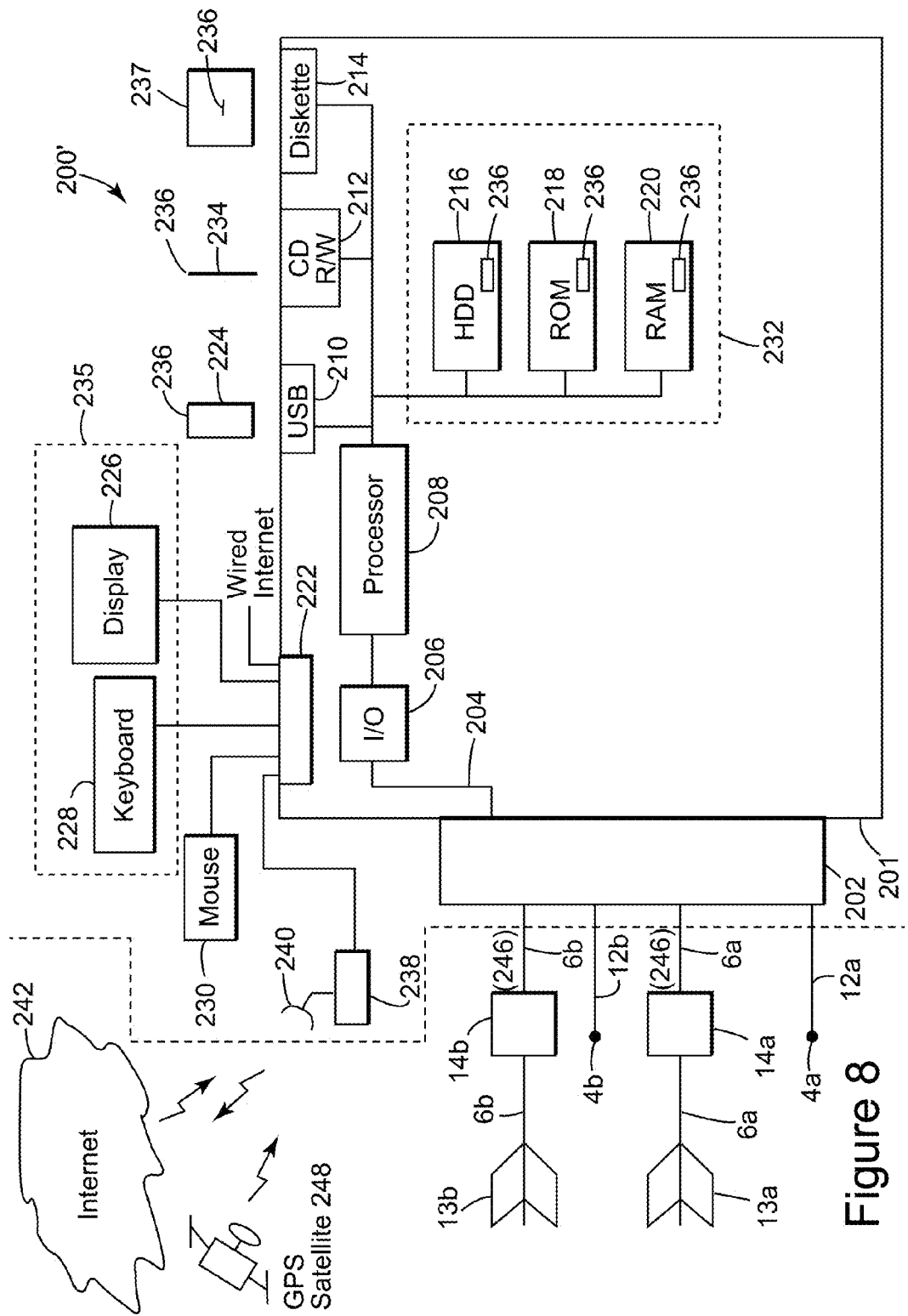
FIG. 8 illustrates a seismic data acquisition system suitable for use to implement a method for determining shallow water multiples using a hybrid multichannel prediction method according to an embodiment.

FIG. 8 illustrates a seismic data acquisition system suitable for use in implementing method 400 for determining shallow water multiples using a hybrid multichannel prediction method according to an embodiment.

FIG. 8 illustrates a seismic data acquisition system (system) 200 suitable for use to implement a method for determining shallow water multiples using a hybrid multichannel prediction method according to an embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232. Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further embodiment, system 200, being ostensibly designed for use in seismic exploration, will interface with one or more sources 4a,b and one or more receivers 14. These, as previously described, are attached to streamers 6a,b, to which are also attached birds 13a,b that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement method 400 for determining shallow water multiples using a hybrid multi-channel prediction method according to an embodiment. Hardware, firmware, software, or a combination thereof, can be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 224). These storage media may be inserted into, and read by, devices such as the CD-ROM drive 212, the disk drives 214, 216, among other types of software storage devices.

The above embodiments were discussed without specifying what type of seismic receivers 14 are used to record the seismic data. In this sense, it is known in the art to use, for a marine seismic survey, streamers 6 that are towed by one or more vessels/ships 2 and the streamers 6 include seismic receivers/detectors 14. The streamers 6 can be horizontal or slanted or having a curved profile as illustrated in FIG. 10.

Figure 10:
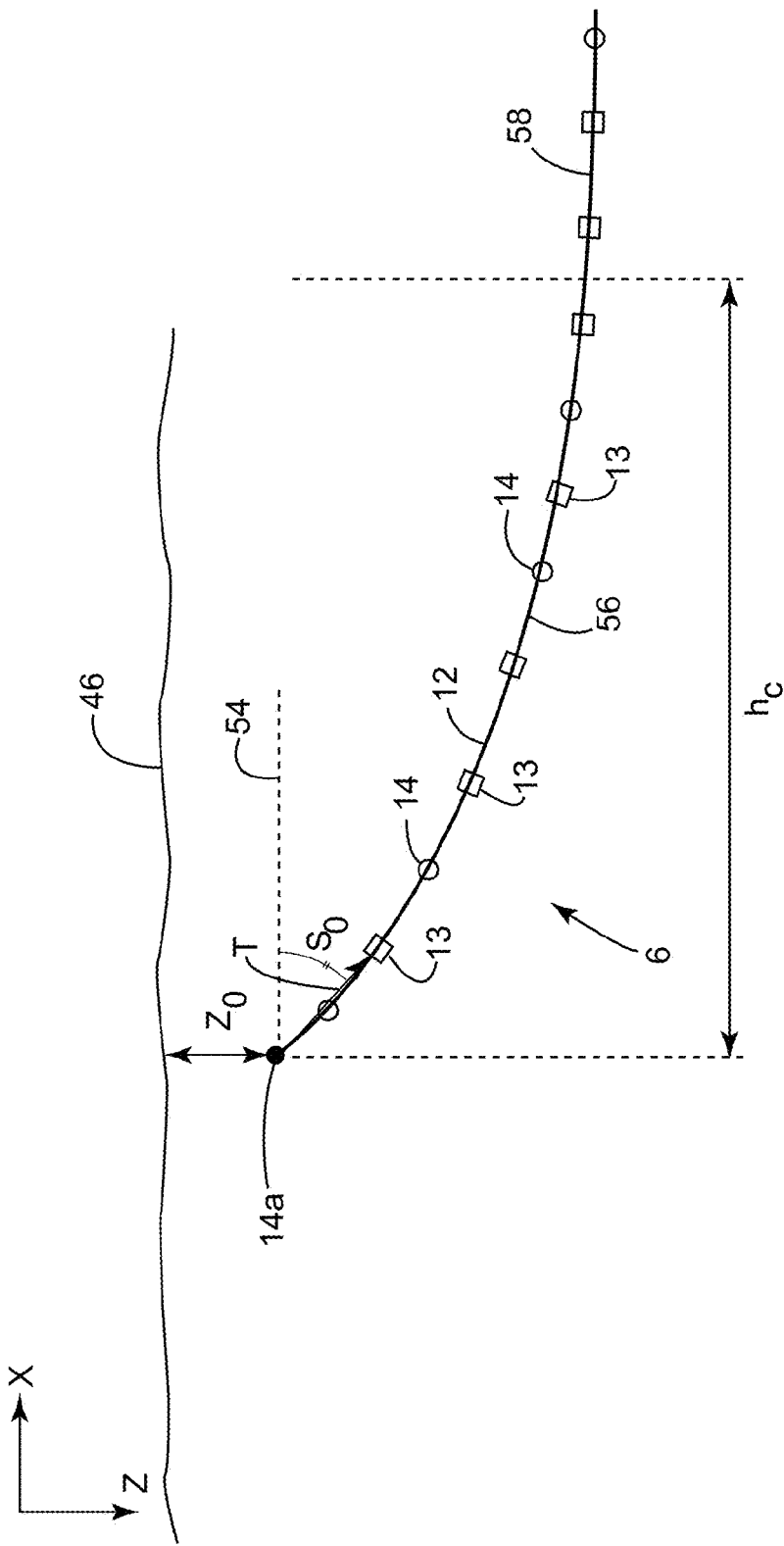
FIG. 10 illustrates a partial side view of another embodiment of the marine seismic exploration system shown in FIG. 1, wherein a curved streamer profile is implemented according to an embodiment.

The curved streamer 6 of FIG. 10 includes a body or cable 12 having a predetermined length; plural detectors 14 provided along the body 12; and plural birds 13 provided along body 12 for maintaining the selected curved profile. Curved streamer 6 is configured to flow underwater when towed such that the plurality of detectors 14 are distributed along the curved profile. The curved profile can also be described by as parameterized curve, e.g., a curve described by (i) a depth $z_0$ of a first detector 14 (measured from the water surface 46), (ii) a slope $s_0$ of a first portion T of body 12 with an axis 54 parallel with water surface 46, and (iii) a predetermined horizontal distance $h_c$ between the first detector 14a and an end of the curved profile. It should be noted that not the entire streamer 6 has to have the curved profile. In other words, the curved profile should not be construed to always apply to the entire length of streamer 6. While this situation is possible, the curved profile may be applied only to a first portion 56 of streamer 6. In other words, streamer 6 can have (i) only a first portion 56 having the curved profile or (ii) a first portion 56 having the curved profile and a second portion 58 having a flat profile, the two portions being attached to each other.

Figure 11:
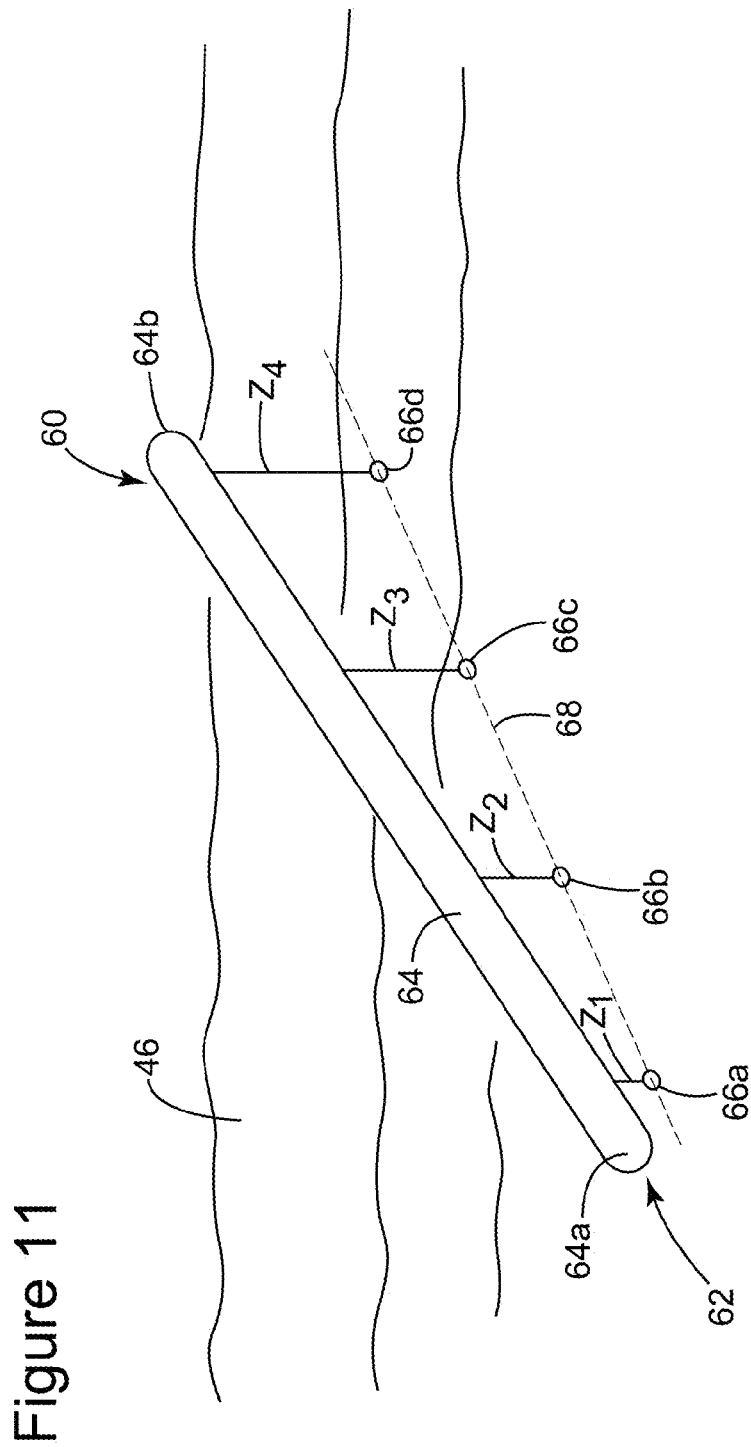
FIG. 11 illustrates a multi-level source for use with the marine seismic exploration system shown in FIG. 1 according to an embodiment.

Further, the above embodiments may be used with multi-level source 60. FIG. 11 illustrates multi-level source 60 for use with marine seismic exploration system 10 shown in FIG. 1 according to an embodiment. Multi-level source 60 has one or more sub-arrays 62. The first sub-array 62 has a float 64 that is configured to float at the water surface 46 or underwater at a predetermined depth. Plural source points 66a-d are suspended from the float 64 in a known manner. A first source point 66a may be suspended closest to the head 64a of the float 64, at a first depth z1. A second source point 66b may be suspended next, at a second depth z2, different from z1. A third source point 66c may be suspended next, at a third depth z3, different from z1 and z2, and so on. FIG. 11 shows, for simplicity, only four source points 66a-d, but an actual implementation may have any desired number of source points 66. In one application, because source points 66 can be distributed at different depths, the source points 66 at the different depths are not simultaneously activated. In other words, the source array is synchronized, i.e., a deeper source point 66 is activated later in time (e.g., 2 ms for 3 m depth difference when the speed of sound in water is 1500 m/s) such that corresponding sound signals produced by the plural source points 66 coalesce, and thus, the overall sound signal produced by the source array appears as being a single sound signal.

The depths z1 to z4 of the source points of the first sub-array 62 can obey various relationships. In one application, the depths of source points 66 increase from head 64a toward the tail 64b of float 64, i.e., $z1<z2<z3<z4$ In another application, the depths of source points 66 decrease from head 64a to tail 64b of float 66. In another application, source points 66 are slanted, i.e., provided on an imaginary line 68. In still another application, line 68 is a straight line. In yet another application, line 68 is a curved line, e.g., part of a parabola, circle, hyperbola, etc. In one application, the depth of the first source point 66a for the sub-array 62 is about 5 m and the largest depth of the last source point 66d is about 8 m. In a variation of this embodiment, the depth range is between about 8.5 and about 10.5 m or between about 11 and about 14 m. In another variation of this embodiment, when line 68 is straight, the depths of the source points 66 increase by 0.5 m from a first source point to an adjacent source point. Those skilled in the art would recognize that these ranges are exemplary and these numbers may vary from survey to survey. A common feature of all these embodiments is that source points 66 have variable depths so that a single sub-array 62 exhibits multiple-level source points 66.

Figure 12:
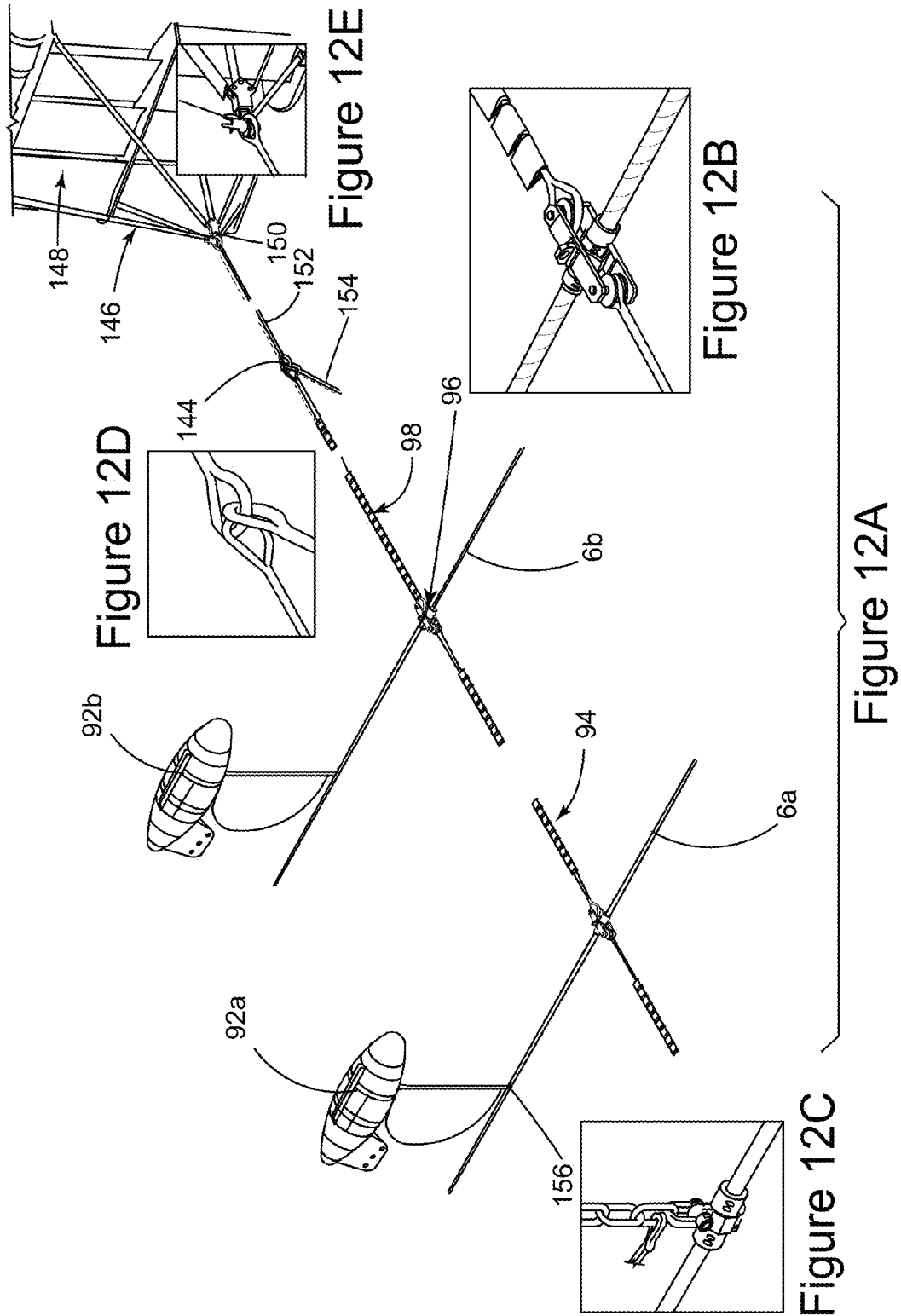
FIGS. 12A through 12E illustrate a configuration of at least two streamers for use in the marine seismic exploration system shown in FIG. 1.

FIGS. 12A through 12E illustrate a configuration of at least two streamers 6a, 6b for use in the marine seismic exploration system 10 shown in FIG. 1. In FIGS. 12A through 12E, a particular configuration of first and second streamers 6a, 6b are shown that illustrate several exemplary devices that assist in maintaining directional control and stability of streamers 6 in marine exploration system 10. The devices include spread ropes 94, that separate streamers 6, bend restrictors 96 that join spread ropes 94 to streamers 6, and spurline 98, which connects streamer 6b to 3-Eye splice 144, which attaches to bridle block 150 and deflector 148. At least one purpose of deflector 148 is to provide a force to said plurality of streamers 6 to maintain directional stability and control. A close up view of bridle block 150 is shown in FIG. 12E. A close up view of 3-Eye splice is shown in FIG. 12D. A close up view of bend restrictor 96 is shown in FIG. 12B. Head buoys 92a, 92b provide a visual indication of the location of streamers 6, and they are connected to streamers 6 by restrictors 156, a close up view of which is shown in FIG. 12C.

Figure 13:
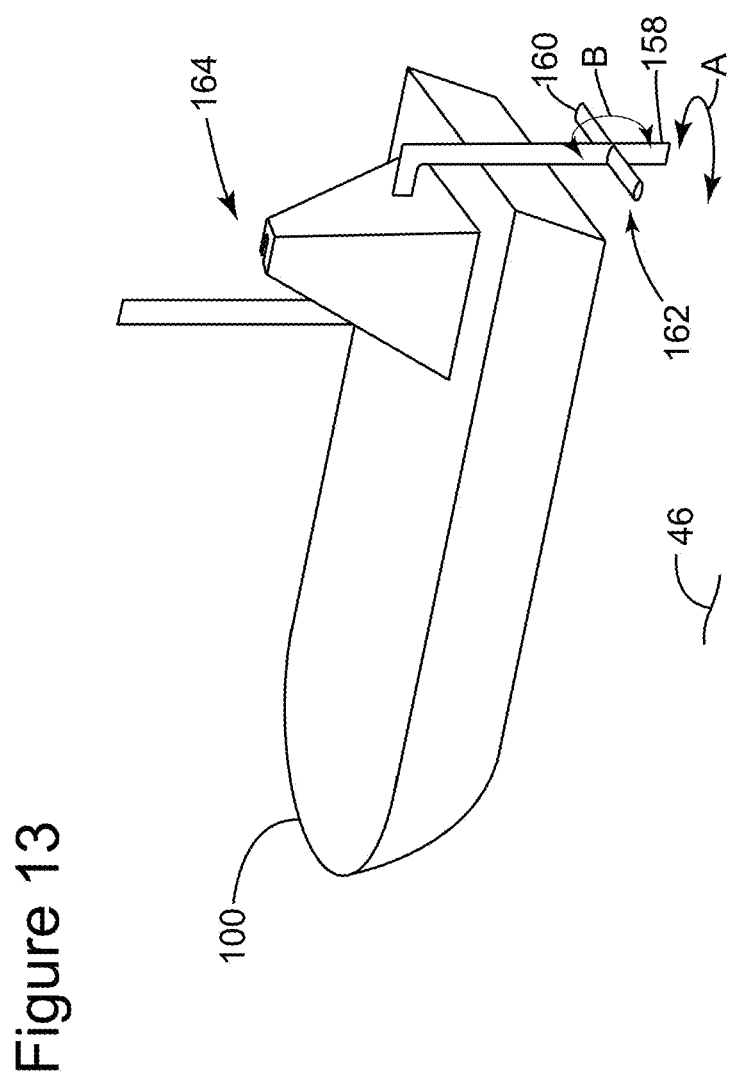
FIG. 13 illustrates a tail-buoy for use with the marine seismic exploration system shown in FIG. 1 with a ballasted keel shown in the extended position.
Figure 14:
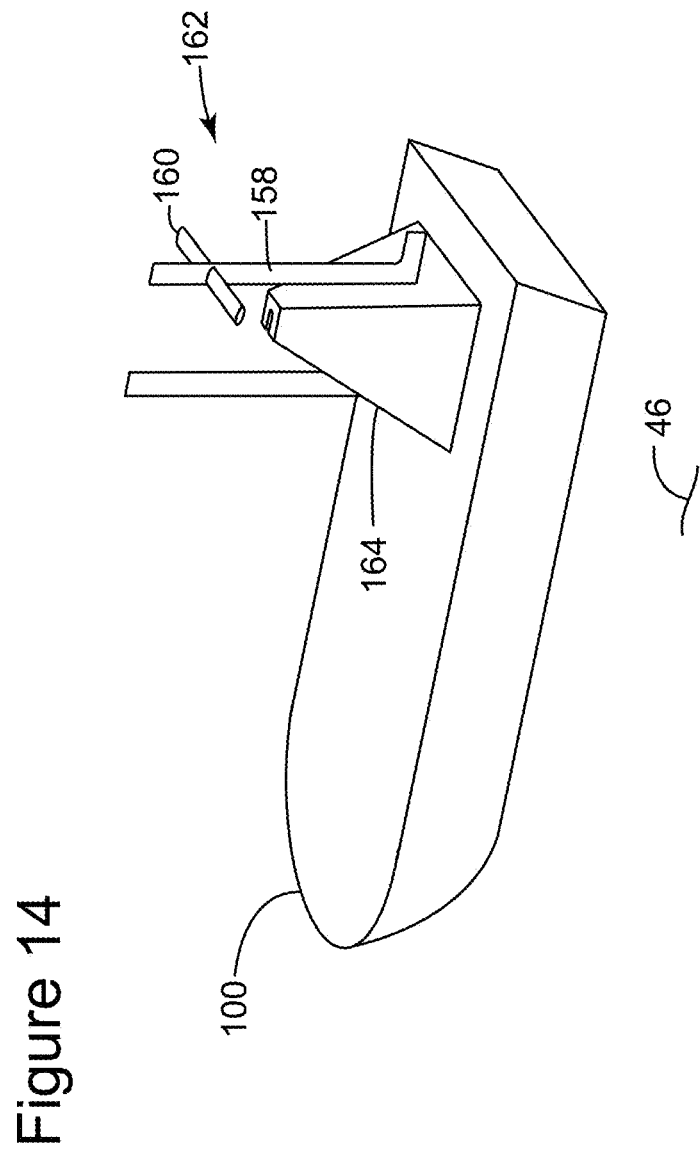
FIG. 14 illustrates a tail-buoy for use with the marine seismic exploration system shown in FIG. 1 with the ballasted keel shown in the retracted position.

FIG. 13 illustrates tail-buoy 100 for use with marine seismic exploration system 10 shown in FIG. 1 with ballasted keel 162 shown in the extended position, and FIG. 14 illustrates tail-buoy 100 for use with marine seismic exploration system 10 shown in FIG. 1 with ballasted keel shown 162 in the retracted position. The purpose of tail-buoy 100 is to (a) provide a visual indicator of the end of streamers 6, and (b) to assist in maintaining directional stability and control of streamers 6. This is especially true with Broadseis streamer configurations. In order to accomplish both functions, it is necessary to maintain directional control of tail-buoy 100 in much the same manner as is done with birds 13. Therefore, ballasted keel 162 with pitch and yaw stabilizers 160, 158 have been added. Yaw stabilizer 158 comprises most of ballasted keel 162, as it is shown to be the vertical component that can be controlled much in the same manner as a rudder for a boat. That is, when it is determined to have tail-buoy 100 turn to the left, directional controls are sent to it and received at navigation mast 154 (which contains power sources, signal processing circuitry, and so on, a detailed description of which has been omitted for the dual purposes of clarity and brevity), so that yaw stabilizer 158 turns to the left, causing the nose of tail-buoy 100 to swing to the left as water passes around yaw stabilizer 158, as those of ordinary skill in the art can appreciate. The same general principles apply when it is desired to turn tail-buoy 100 to the right. Pitch stabilizer 160 assists in maintaining direction control in much the same manner, but is used to impart a down-ward or up-ward force on the body of tail-buoy 100 with respect to the surrounding water. According to an alternate embodiment, pitch stabilizer 160 can be made fixed and not controllable by remote command. When not needed, or for storage purposes, ballasted keel 164 can be stored in a retracted position, as shown in FIG. 14. Additional motors, servos, and appropriate command and control circuitry can be provided to effectuate those functions, or the same can be accomplished manually, without additional circuitry and so on; when stored, ballasted keel 162 is folded up and a pin keeps in the retracted condition, and when placed in the water, the pin is removed, ballasted keel 162 folds down, the ballast drives ballasted keel 162 in the down position.

It should be noted in the embodiments described herein that these techniques can be applied in either an "offline", e.g., at a land-based data processing center or an "online" manner, i.e., in near real time while on-board the seismic vessel. For example, the system and method for determining shallow water multiples using a hybrid multichannel prediction method according to an embodiment can occur as the seismic data is recorded on-board the seismic vessel. In this case, it is possible for substantially multiples-free data to be generated as a measure of the quality of the sampling run.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/non-volatile computer storage media. For example, the processor can access a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for determining shallow water multiples using a hybrid multichannel prediction method according to an embodiment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for determining a shallow water multiples model, the method comprising:
    generating a series of underwater seismic wavelets by one or more sources;
    acquiring seismic data from a plurality of receivers, and storing the seismic data;
    estimating a prediction operator by a shallow water demultiple (SWD) technique using the acquired receiver seismic data;
    generating a multi-channel water layer de-multiple (MWD) primary reflections model using the acquired receiver seismic data; and
    merging said SWD prediction operator with said MWD primary reflection model and with said acquired receiver seismic data to determine the shallow water multiples model,
    wherein the step of generating a MWD primary reflections model comprises:

estimating a travel time of the transmitted seismic wavelets from one or more sources to each of a plurality of receivers; and generating the MWD primary reflection model using the estimated travel time and Green's function.

2. The method according to claim 1, wherein the step of estimating an SWD prediction operator comprises:

using a model of water layer related multiples, M with respect to said acquired receiver seismic data, P; and determining the prediction operator according to $$M = \Delta P w^{-1} P \text{ and}$$

$$M = FP,$$

wherein the SWD prediction operator F is equivalent to $\Delta P$, a primary response, and $w^{-1}$ is a source wavelet.

3. The method according to claim 1, wherein Green's function is evaluated according to the expression $$G(\vec{s},\vec{r};\omega) = \int G(\vec{s},\vec{r};\omega) F'(\vec{s},\vec{x},R) G(\vec{X},R;\omega) d\vec{x}$$

where $\vec{s}$ and $\vec{r}$ are source and receiver locations, respectively, F' is an auto-picked water bottom event from the multichannel prediction operator F at location $\vec{x}$, and $\omega$ is frequency.

4. The method according to claim 3, wherein auto-picking is performed using one or more the following criteria: estimation of the time of the water bottom reflection event, amplitude, amplitude ratio, and neighbouring trace information.

5. The method according to claim 1, wherein the step of estimating the travel time of the transmitted seismic wavelets from the one or more sources to each of the plurality of receivers comprises:

evaluating a second Green's function according to the following expression $$G = \frac{j}{4} \times H_0^{(2)}(kr),$$

wherein $j = \sqrt{-1}$ $$k = \frac{\omega}{c},$$

where $\omega$ is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to $\omega \times t$, where t is the travel time, which is the same as distance r divided by velocity c.

6. The method according to claim 1, wherein the step of merging the SWD prediction operator with the MWD primary reflection model and with acquired receiver data to determine a shallow water multiples model comprises:

merging the generated MWD primary reflection models with the SWD prediction operator to create a hybrid prediction operator; and convoluting the hybrid prediction operator with the acquired receiver data to determine the shallow water multiples model.

7. The method according to claim 6, wherein the step of merging the generated MWD primary reflections models with the SWD prediction operator to create a hybrid prediction operator comprises:

overlaying Green's function on top of the SWD prediction operator.

8. A method for predicting a shallow water multiples model in seismic receiver data comprising:

generating a series of underwater seismic wavelets by one or more sources;

acquiring seismic data from a plurality of receivers, and storing the seismic data;

estimating a multi-channel prediction operator F by shallow water demultiple (SWD) technique;

generating a model of the Green's functions of the water layer primary reflections;

merging the generated water layer primary reflections model with the multi-channel prediction operator F to create a hybrid multi-channel prediction operator $F_H$; and convolving the hybrid multi-channel prediction operator $F_H$ with receiver data to determine the shallow water multiples model.

9. The method according to claim 8, wherein the step of estimating a multi-channel prediction operator F by shallow water demultiple (SWD) technique comprises:

using a model of water layer related multiples, M with respect to said acquired receiver seismic data, P; and determining the multi-channel prediction operator F according to $$M = \Delta P w^{-1} P \text{ and}$$

$$M = FP,$$

wherein the multi-channel prediction operator F is equivalent to $\Delta P$, a primary response, and $w^{-1}$ is a source wavelet.

10. The method according to claim 8, wherein the step of generating a model of the Green's functions of the water layer primary reflections comprises:

estimating a travel time of the transmitted seismic wavelets from one or more sources to each of a plurality of receivers; and generating the model of the Green's functions of the water layer primary reflections using the estimated travel time and Green's function.

11. The method according to claim 10, wherein Green's function is evaluated according to the expression $$G(\vec{s},\vec{r};\omega) = \int G(\vec{s},\vec{x};\omega) F'(\vec{s},\vec{x},r) G(\vec{x},\underline{r};\omega) d\vec{x}$$

where $\vec{s}$ and $\vec{r}$ are source and receiver locations, respectively, F' is an auto-picked water bottom event from the multichannel prediction operator F at location $\vec{x}$, and $\omega$ is frequency.

12. The method according to claim 11, wherein auto-picking is performed using one or more the following criteria: estimation of the time of the water bottom reflection event, amplitude, amplitude ratio, and neighbouring trace information.

13. The method according to claim 10, wherein the step of estimating a travel time of the transmitted seismic wavelets from the one or more sources to each of the plurality of receivers comprises:

evaluating a second Green's function according to the following expression $$G = \frac{j}{4} \times H_0^{(2)}(kr),$$

wherein $j=\sqrt{-1}$, $$k = \frac{\omega}{c},$$

where $\omega$ is frequency, c is velocity, r is a distance from a first source to a first receiver, and $H_0^{(2)}$ is a $0^{th}$ order Hankel function of the second kind, and further wherein the variable "kr" is equal to $$\frac{\omega}{c} \times r,$$

which is equal to $\omega \times t$, where t is the travel time, which is the same as distance r divided by velocity c.

14. The method according to claim 8, wherein the step of merging the generated water layer primary reflections model F with the multi-channel prediction operator F to create a hybrid multi-channel prediction operator $F_H$, comprises:
overlaying Green's function on top of the prediction operator.

15. The method according to claim 8, further comprising:
generating an output seismic wave signal of a Geographical Area of Interest by subtracting the final multiples model from the received and stored seismic data; and
displaying the generated output seismic wave signal as representative of a floor of a shallow body of water environment.

16. A system for determining shallow water multiples associated with seismic data processing, the system comprising:
a processor configured to:
estimate a multi-channel prediction operator F using a model of water layer related multiples with respect to received and stored seismic data,
estimate a travel time of the transmitted seismic wavelets from one or more sources to each of a plurality of receivers,
generate a water layer primary reflections models using the estimated travel time and Green's function,
merge the generated water layer primary reflections models with the multi-channel prediction operator F to create a hybrid multi-channel prediction operator $F_H$, and
convolute the hybrid multi-channel prediction operator $F_H$ with the stored received data to determine a final multiples model.

17. The system according to claim 16, wherein
the processor is further configured to generate an output seismic wave signal by subtracting the final multiples model from the received and stored seismic data, and generate a display signal for a display to display the generated output seismic wave signal as representative of a floor of a shallow body of water environment.

18. The system according to claim 16, wherein
the processor is further configured to stack the multi-channel prediction operator F to improve a signal-to-noise ratio (SNR) of reflections off a seafloor.

19. The system according to claim 16, wherein Green's function is evaluated by the processor according to the expression $$G(\vec{s},\vec{r};\omega) = \int G(\vec{s},\vec{x};\omega) F'(\vec{s},\vec{x},r) G(\vec{x},\vec{s};\omega) d\vec{x}$$

where $\vec{s}$ and $\vec{r}$ are source and receiver locations, respectively, F' is an auto-picked water bottom event from the multichannel prediction operator F at location $\vec{x}$, and $\omega$ is frequency.

* * * * *